US010869107B2

(12) United States Patent
Coughlin et al.

(10) Patent No.: US 10,869,107 B2
(45) Date of Patent: Dec. 15, 2020

(54) SYSTEMS AND METHODS TO REPLICATE NARRATIVE CHARACTER'S SOCIAL MEDIA PRESENCE FOR ACCESS BY CONTENT CONSUMERS OF THE NARRATIVE PRESENTATION

(71) Applicant: PODOP, INC., Santa Monica, CA (US)

(72) Inventors: Samantha Grace Coughlin, Brooklyn, NY (US); Jose Raul Castillo, Brooklyn, NY (US); Nicolas Dedual, New York, NY (US); Derek H. B. Chung, Brooklyn, NY (US); Christina Huynh, New York, NY (US); Jared Michael Brinkley, Seattle, WA (US)

(73) Assignee: PODOP, INC., Santa Monica, CA (US)

( * ) Notice: Subject to any disclaimer, the term of this patent is extended or adjusted under 35 U.S.C. 154(b) by 0 days.

(21) Appl. No.: 16/412,085

(22) Filed: May 14, 2019

(65) Prior Publication Data
US 2019/0356969 A1 Nov. 21, 2019

Related U.S. Application Data

(60) Provisional application No. 62/671,890, filed on May 15, 2018, provisional application No. 62/745,715, filed on Oct. 15, 2018.

(51) Int. Cl.
*H04N 21/8545* (2011.01)
*H04N 21/858* (2011.01)
(Continued)

(52) U.S. Cl.
CPC ..... *H04N 21/8545* (2013.01); *G06F 16/4393* (2019.01); *G06F 16/447* (2019.01);
(Continued)

(58) Field of Classification Search
CPC .......... H04N 21/262; H04N 21/26208; H04N 21/26291; H04N 21/2668
(Continued)

(56) References Cited

U.S. PATENT DOCUMENTS

2013/0104072 A1* 4/2013 Havard .............. G06Q 30/0641
715/781
2013/0216204 A1 8/2013 Kulakov
(Continued)

FOREIGN PATENT DOCUMENTS

| KR | 10-2010-0002061 | 2/2010 |
| KR | 10-2011-0106139 | 9/2011 |
| WO | 2016115154 A1 | 7/2016 |

OTHER PUBLICATIONS

International Search Report and Written Opinion for PCT/US2019/032264, dated Aug. 29, 2019, 7 pages.

*Primary Examiner* — Dominic D Saltarelli
(74) *Attorney, Agent, or Firm* — Cozen O'Connor

(57) ABSTRACT

A content distribution system provides access to supplemental content (e.g., social media shares attributable to characters) based on progress of a content consumer in a narrative presentation. The narrative presentation comprises a set of narrative segments that the content consumer may experience using a set of instructions stored on a content consumer device. The content distribution system may determine a current point in time of the content consumer in experiencing the narrative presentation and, as a result of the current point determined, provide access to supplemental content related to the narrative presentation. The supplemental content to which the content consumer is provided access may include a social media instance comprised of social media content. The composition of the social media instance may
(Continued)

be based at least in part on the current point in time of the content consumer in experiencing the narrative presentation.

21 Claims, 10 Drawing Sheets

(51) Int. Cl.
*G06F 16/9536* (2019.01)
*G06F 16/44* (2019.01)
*G06F 16/43* (2019.01)
*G06Q 50/00* (2012.01)
*G06F 16/438* (2019.01)

(52) U.S. Cl.
CPC ......... *G06F 16/9536* (2019.01); *G06Q 50/01* (2013.01); *H04N 21/858* (2013.01)

(58) Field of Classification Search
USPC .............................................. 725/32, 34, 35
See application file for complete search history.

(56) References Cited

U.S. PATENT DOCUMENTS

2015/0271546 A1* 9/2015 Kim ................... H04N 21/4307
725/109
2017/0245023 A1 8/2017 Brelis et al.

\* cited by examiner

SYSTEMS AND METHODS TO REPLICATE NARRATIVE CHARACTER'S SOCIAL MEDIA PRESENCE FOR ACCESS BY CONTENT CONSUMERS OF THE NARRATIVE PRESENTATION

TECHNICAL FIELD

This application is generally related to narrative presentations, for example an interactive media presentation, in which media content consumers may experience social media content attributable to one or more characters in the narrative presentation, or instance fictional characters or non-fictional characters who did not actually generate the attributable social media content.

BACKGROUND

The art of storytelling is a form of communication dating back to ancient times. Storytelling allows humans to pass information on to one another for entertainment and instructional purposes. Oral storytelling has a particularly long history and involves the describing of a series of events using words and other sounds. More recently, storytellers have taken advantage of pictures and other visual presentations to relate the events comprising the story. Particularly effective is a combination of audio and visual representations, most commonly found in motion pictures, television programs, and audio-visual media presentations.

Until recently, narrative presentations have typically been non-interactive, the series of events forming the story being presented as a sequence of scenes in a predefined set (i.e., linear) chosen by a director or editor. Media content consumers view the narrative presentations going from scene to scene without the opportunity to experience more detailed nuances of or relating to the story. Details of a narrative presentation regarding a character's thoughts or background details of locations, events, and persons of or related to the narrative presentation are sometimes omitted. Attempts by directors, producers, or writers to include such details often seem clunky or forced, and may distract from the narrative presentation or overall quality thereof. Although some supplemental content is available in the form of actor commentary or behind the scenes cuts (e.g., BLU-RAY LIVE®), such content often does not provide added details to the content consumer in an engaging manner. Moreover, such features rely on the presentation of scenes in an order predefined by the director or editor.

Additionally, content consumers of audio-visual media (i.e., movies, television shows) experience the narrative presentation in a fixed manner. For instance, content consumers are unable to interact with characters or investigate details regarding the narrative presentation. Because the details of a narrative presentation are the same or similar each time it is viewed, content consumers may grow bored with the narrative presentation after one or two viewings. Further, the proliferation of "director's cuts" released after release of a "theatrical cut" demonstrates the substantial interest in viewing a given story from different perspectives.

BRIEF SUMMARY

A method of providing entertainment may be summarized as including for a first content media consumer of a first narrative presentation, at a first time, determining a current point of the first content media consumer in experiencing a presentation of the first narrative presentation; and providing the first content media consumer with access to a first instance of a first static social media site, the first instance of the first static social media site which includes a first set of social media content available to the first content media consumer during a first period of time, the first set of social media content comprising content that represents content that would have been shared by at least a first character in the first narrative presentation, a composition of the first set of social media content based at least in part on the determined current point of the first content media consumer in experiencing the presentation of the first narrative presentation.

The method may further include for the first content media consumer of the first narrative presentation, at a second time, determining a second current point of the first content media consumer in experiencing the presentation of the first narrative presentation; and providing the first content media consumer with access to a second instance of the first social media site, the second instance of the first social media site which includes a second set of social media content available to the first content media consumer during a second period of time, the second set of social media content comprising content that represents content that would have been shared by at least the first character in the first narrative presentation, a composition of the second set of social media content based on the determined second current point of the first content media consumer in experiencing the presentation of the first narrative presentation, the composition of the second set of social media content different from the composition of the first set of social media content. The first narrative presentation may be an interactive narrative presentation including a plurality of narrative segments selectable by the first content media consumer, and determining the current point of the first content media consumer in experiencing a presentation of the first narrative presentation may include determining which of the plurality of narrative segments have been presented to the first content media consumer. The first narrative presentation may be an interactive narrative presentation including a plurality of narrative segments selectable by the first content media consumer, and determining the current point of the first content media consumer in experiencing a presentation of the first narrative presentation may include determining which of the plurality of narrative segments have been presented to the first content media consumer and an elapsed time into a presentation of a currently presented one of the narrative segments.

The method may further include receiving a first request from the first content media consumer; and determining whether the received first request was generated from within a presentation application via which the first narrative presentation is presented to the first media content consumer, wherein providing the first content media consumer with access to a first instance of a first static social media site is at least in part in response to a determination that the received first request was generated from within the presentation application.

The method may further include receiving a second request from the first content media consumer; determining whether the received second request was generated from within the presentation application via which the first narrative presentation is presented to the first media content consumer; and providing the first content media consumer with access to a first dynamic social media site at least in part in response to a determination that the received second request was generated from outside the presentation application. Providing the first content media consumer with access to a first instance of a first social media site that includes a first set of social media content available to the first content media consumer may include presenting the first instance of the first social media site within a presentation application via which the first narrative presentation is presented.

Providing the first content media consumer with access to a first instance of a first social media site that includes a first set of social media content available to the first content media consumer may include providing a selectable link within a presentation application via which the first narrative presentation is presented, selection of which may cause a switching from the presentation application to a second application, the second application different from the presentation application. Switching from the presentation application to a second application may include switching from the presentation application to a Web browser application.

The method may further include determining which of a number of operating systems (iOS/Android vs tvOS) is being used by a processor-based device to present the first narrative presentation to the first media content consumer via a presentation application.

The method may further include determining how to provide the first media content consumer with access to the first instance of the first social media site based at least one part on the determination of the operating systems that is being used by the processor-based device to present the first narrative presentation to the first media content consumer via the presentation application. Determining how to provide the first media content consumer with access to the first instance of the first social media site may include determining whether to present the first instance of the first social media site to the first media content consumer via the presentation application or present within a selectable link within the presentation application, selection of which may cause a switching between the presentation application and a second application, the second application different than the presentation application. Providing the first content media consumer with access to a first instance of a first social media site may include providing access to the first set of social media content which includes fictional content that represents content that would have been shared by at least the first character in the first narrative presentation. Determining a current point of the first content media consumer in experiencing a presentation of the first narrative presentation may include determining a timestamp associated with current point of the first content media consumer in experiencing the presentation of the first narrative presentation.

The first narrative presentation may be an interactive narrative presentation including a plurality of narrative segments selectable by the first content media consumer, and determining a current point of the first content media consumer in experiencing a presentation of the first narrative presentation may include determining a timestamp associated with current point of the first content media consumer in experiencing the presentation of a currently presented one of the narrative segments of the first narrative presentation. Providing the first content media consumer with access to a first instance of a first social media site may include providing the first content media consumer with access to a first instance of a first social media site that includes at least one of social media text posts, social media photo sharing posts, social media audio-visual media sharing posts, blogging posts or micro-blogging posts.

The method may further include at the first time, providing the first content media consumer with access to a first instance of a second social media site, the first instance of the second social media site which includes a second set of social media content available to the first content media consumer during the first period of time, the second set of social media content comprising content that represents content that would have been shared by at least the first character in the first narrative presentation, a composition of the second set of social media content based on the determined current point of the first content media consumer in experiencing the presentation of the first narrative presentation, the composition of the second set of social media content different from the composition of the first set of social media content.

The method may further include for a second content media consumer of the first narrative presentation, at a second time, the second time different from the first time, determining a current point of the second content media consumer in experiencing a presentation of the first narrative presentation; and providing the second content media consumer with access to the first instance of a first social media site, the first instance of the first static social media site which includes the first set of social media content available to the second content media consumer during a second period of time, the first set of social media content comprising content that represents content that would have been shared by at least a first character in the first narrative presentation, a composition of the first set of social media content based at least in part on the determined current point of the second content media consumer in experiencing the presentation of the first narrative presentation, where the determined current point of the second content media consumer in experiencing the presentation of the first narrative presentation at the second time is the same as the determined current point of the first content media consumer in experiencing the presentation of the first narrative presentation at the first time.

Providing the first content media consumer with access to a first instance of a first social media site may include providing the first content media consumer with access to a first faux static social media site, the content available via the first faux static social media site being identical for any content media consumer at a defined point in the presentation of the first narrative presentation independent of a real world time at which the respective content media consumer accesses the first faux static social media site. Providing the first content media consumer with access to a first instance of a first social media site may include providing the first content media consumer with access to a first faux static social media site which is populated entirely by content attributable to characters in the first narrative presentation.

A system to provide entertainment may be summarized as including at least one processor; at least one nontransitory processor-readable medium that stores at least one of processor-executable instructions or data which, when executed by the at least one processor, causes the at least one processor to: for a first content media consumer of a first narrative presentation, determine a current point of the first content media consumer in experiencing a presentation of the first narrative presentation; and provide the first content media consumer with access to a first instance of a first static social media site, the first instance of the first static social media site which includes a first set of social media content available to the first content media consumer during a first period of time, the first set of social media content comprising content that represents content that would have been shared by at least a first character in the first narrative presentation, a composition of the first set of social media content based at least in part on the determined current point of the first content media consumer in experiencing the presentation of the first narrative presentation.

BRIEF DESCRIPTION OF THE SEVERAL VIEWS OF THE DRAWINGS

In the drawings, identical reference numbers identify similar elements or acts. The sizes and relative states of elements in the drawings are not necessarily drawn to scale. For example, the positions of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
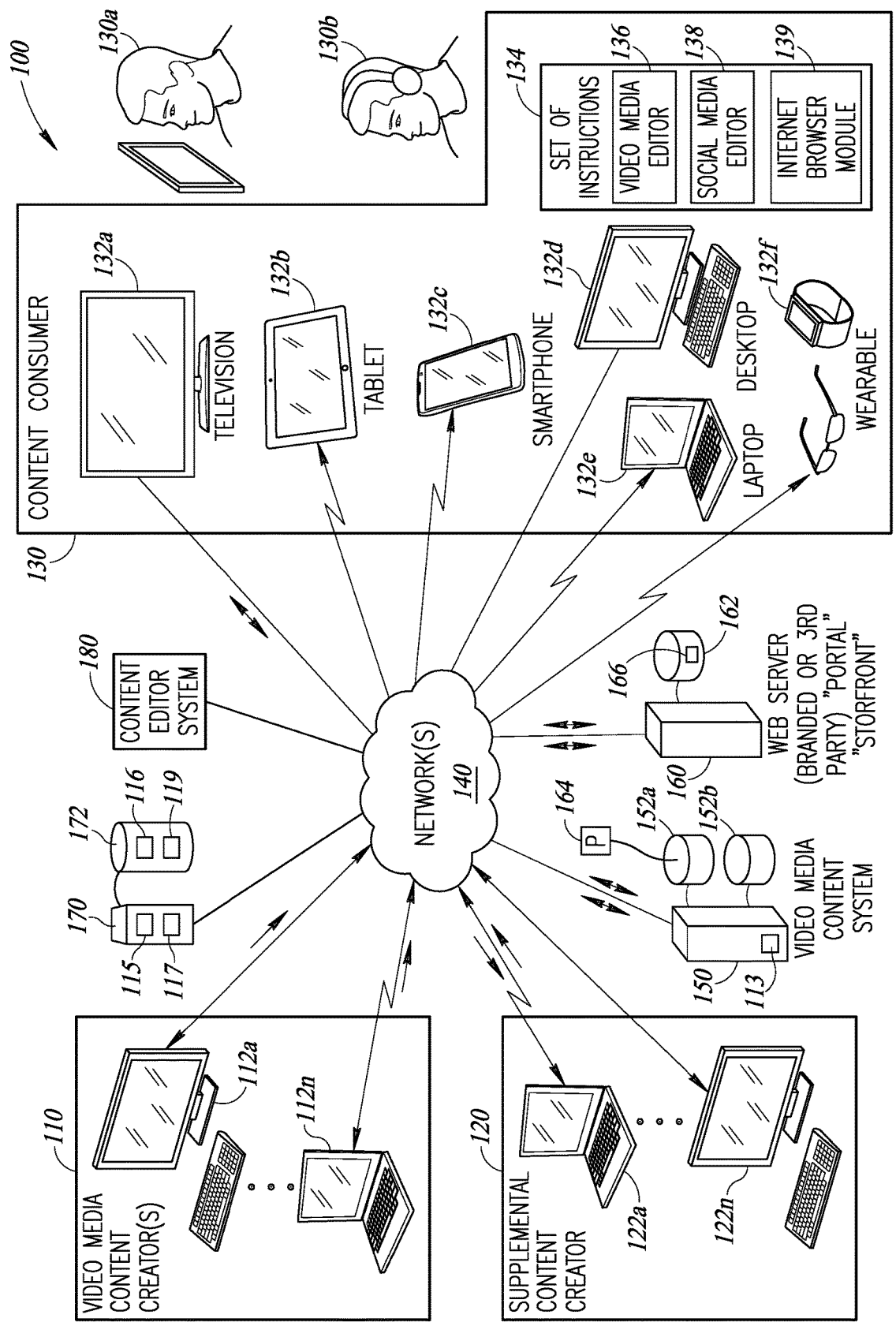
FIG. 1 is a schematic diagram of an illustrative networked content delivery system that includes media content creators, media content consumers, and media content editors, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with processors, user interfaces, nontransitory storage media, media production, or media editing techniques have not been shown or described in detail to avoid unnecessarily obscuring descriptions of the embodiments. Additionally, tethered and wireless networking topologies, technologies, and communications protocols are not shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

"Social media content," as used herein, refers to content (e.g., text posts, photos, images, moving images, audiovisual media) created and shared by a person or entity purporting to be or represent a person, place, or event on a social media site, such as Facebook®, Instagram®, or Reddit®.

"Static social media site," as used herein, refers to a site, accessible via the Internet or other network, that hosts and makes available portions of a collection of social media content to content consumers (e.g., its users), the portions of the social media content which is accessible by a specific content consumer at any given time based, at least in part, on the specific content consumer's progress through a narrative presentation, and is optionally based on social media sharing actions by a content consumer or between content consumers. This contrasts with dynamic social media sites, where, when access is provided or permission is granted by the poster to others, the social media content that is available to others is primarily a function of time (e.g., what has been posted or shared as of the current date and time). In contrast, a static social media site may store large amounts of social media content, yet limit access to portions of that stored social media content based on a specific content consumer's progress through a narrative presentation. Thus, for example, a first content consumer of a first narrative presentation may have access to a first set of the associated social media content attributable to characters in the first narrative at a first date and time, while a second content consumer of the first narrative presentation may have access to a second set of the associated social media content attributable to characters in the first narrative at the first date and time, based on the first content consumer having progressed further through the first narrative than the second content consumer as of the first date and time, where the second set of social media content is different from the first set of social media content. This should not be understood to completely limit static social media sites to having absolutely all social media content authored and stored before a viewing by any given content consumer. While in the typical case, all or most of the social media content for a given narrative presentation will be authored and stored before the narrative presentation is made available to content consumers, the authors, director or editors may, from time-to-time, refresh the social media content, authoring and storing new social media to a library, modifying some of the stored social media content, and, or removing some of the previously stored social media content or otherwise rendering it inaccessible to content consumers.

In some implementations, the collection of social media content of the static social media site is preferably approved or generated by authorized entities. In some implementations, the collection of social media content of the static social media site for any given content consumer is "walled off" or "sandboxed" from the collection of social media content of the other content consumers. Thus, for example, one content consumer may view or experience social media attributable to one or more characters in a narrative, and may further experience the posting or sharing of social media content generated by that same content consumer, however the social media posted or shared by that content consumer is not accessible to other content consumers. Alternatively, one content consumer may view or experience social media attributable to one or more characters in a narrative, and may further experience the posting or sharing of social media content generated by that same content consumer, however the social media posted or shared by that content consumer is not accessible to other content consumers unless reviewed or approved by an authorized moderator or by a machine-learning trained processor-based review system. Such can assure that derogatory, inappropriate or even dangerous content is not shared with other content consumers.

A static social media site has the look and feel of a dynamic social media site (e.g., Facebook®, Pinterest®, Instagram®, Reddit®, Snapchat®), but is limited to content that is related to a narrative presentation, and progress through the narrative presentation. Static social media sites are distinguishable from dynamic social media sites at least in that access to the social media content of a static social media site is limited based on progress through the narrative. Static social media sites may optionally be distinguishable from dynamic social media sites in that the social media content attributable to a character is authored or generated by an author, director, editor, or someone who is not actually the character. Static social media sites may optionally be distinguishable from dynamic social media sites in that the social media content is preferably approved by the authorized entities whereas the content of dynamic social media sites is any content generated by its users.

FIG. 1 shows an example network environment 100 in which media content creators 110 and supplemental content creators 120 are able to create and assemble content for presentation to media consumers 130 (e.g., viewers 130a, listeners 130b), according to at least one illustrated implementation.

The media content creators 110—for example, a content media production team—generate media content 113 (e.g., images, moving pictures, audio-visual) that is assembled into at least one production, such as a narrative presentation 164. The media content 113 may be generated in one or more formats including analog format (e.g., film images, motion picture film images), and digital format (e.g., digital audio recording, digital video recording formats, digitally rendered audio and/or audio-visual recordings, computer generated imagery ["CGI"]). Where at least a portion of the content is in analog format, one or more converter systems or processors convert the analog content to digital format. The media content 113 may include raw media content corresponding to originally produced media content, and edited media content corresponding to media content that has been modified from the originally produced media content. The media content creators 110, using one or more content creator processor-based devices 112a-112n (collectively, "content creator processor-based devices 112"), communicates the media content 113 to one or more media content systems 150 via the network 140 or other appropriate method of transfer.

The supplemental content creators 120, which may include a social media content production team and/or faux Web content production team, generate supplemental content, including social media content 115 and faux Web content 117, relating to the media content 113. The supplemental content is content that simulates the user experience (e.g., look, feel) of publicly available social media Websites and other Internet sites or Websites, which is a fictional construct that supports the narrative presentation, and which a content consumer is directed to when accessing either social media or other Internet or Websites from within a dedicated application (e.g., narrative presentation viewer, faux browser, faux social media application) for instance a set of instructions 134 stored on a content consumer device 132 of the content consumer 130. The supplemental content described herein is "static," meaning that the supplemental content available to a particular content consumer 130 is limited based at least in part on the progress of the content consumer 130 in the narrative presentation 164. Static content is distinguishable from dynamic content available on the World Wide Web at least in that the availability of dynamic content is limited based on real-world time (i.e., whether an entity has "posted" a social media post in real world time) rather than a progress of an individual content consumer through a narrative presentation 164. The collection of supplemental content is also preferably limited to the content produced by authorized entities or approved by authorized entities to be made available to content consumers.

The social media content 115 may be organized into one or more static social media sites 116 for presentation to content consumers 130 over the network 140. The social media site 116 in at least some implementations is static such that the collective social media content available to all content consumers 130 is limited, for example limited to a particular content consumer's then current progress through the narrative. Preferably, a static social media site 116 limits the collective social media instances (e.g., profiles, posts, background information) available for the content consumers 130 to experience or interact with to social media content created or approved by the social media content creators or moderators.

In a static social media site, social media content created by content consumers 130 is preferably inaccessible for viewing or interaction with by other content consumers 130 unless approved by the social media content creators or other such authorized entities including, for example, machine-learning trained processor-based review system. Although content consumers 130 may create or modify their own social media profile, the content consumer 130 profiles may be inaccessible by other content consumers 130 unless approved by an authorized entity. At least some interactions with social media instances by the content consumers 130 may be unavailable for viewing or interacting with by other content consumers 130. In some implementations, social media content generated by content consumers 130 may be presented to other content consumers 130 where such content is approved for sharing by an authorized entity, such as the social media content creators. In some implementations, the static social media site 116 is a "faux social media site" that is populated entirely by content attributable to fictional characters in or related to the narrative presentation 164. The static social media site 116 helps to prevent or restrict content consumers 130 from being exposed to inappropriate or potentially harmful interactions with other content consumers 130, and helps to prevent or restrict aspects of the narrative presentation 164 from being spoiled by other content consumers 130.

The social media site 116 comprises character profiles of characters (e.g., fictional characters, historical characters who did not generate the social media content attributed to them in the narrative presentation) in the media content 113 and social media posts (e.g., text, images, audio, audio-visual) of or about the characters in the media content 113. The character profiles may include information related to the narrative presentation 164 and/or the character(s) therein. The character profile information may help to provide a multifaceted view of the characters or narrative presentation 164 by providing images and video (e.g., photographs, animation, computer-generated images, illustrations) of persons, places, and events relevant to the character or narrative presentation 164; information indicating interests of characters (e.g., "likes", links); friends and acquaintances of characters, locales to which the character has attended; events that the character(s) have or are interested in attending. The social media posts may include text, audio-visual files, images, or a combination thereof, purportedly generated by, or otherwise attributable to, the characters; reposts of other characters or organizations included in or relevant to the narrative presentation 164 of the media content 113; or comments to other social media posts. The social media site 116 may comprise social media instances 118, as discussed below, of text, audio-visual files, images, events, etc. posted by characters related to the narrative presentation 164.

The faux Web content 117 is preferably content, created by the supplemental content creators 120, comprising at least some fictitious Webpages or parts thereof (e.g., images, text) having content related to the narrative presentation 164. The faux Web content 117 simulates the look and feel of comparable Web content on the Internet (e.g., news Websites, blogs). Attempts to access social media content and, or other Internet content within an application (e.g., narrative presentation viewer, faux browser, faux social media application) can preferably cause the content consumer 130 to interact with the faux Web content or faux Internet content, for example via execution of the set of instructions 134 stored on the content consumer device 132 or by communication with the Webserver 160 over an extranet. The faux Web content 117 is organized into one or more static faux Webpages 122 or faux Websites 119 having at least some content related to the narrative presentation 164, and which look and feel like real Websites (e.g., news Websites, e-commerce Websites, informational Websites). and individual Webpages thereof. The content consumers 130 may access the static faux Websites 119 using a browser module 139 encoded in a set of instructions 134 to determine information regarding fictional characters, events, locations, etc. involved in the narrative presentation 164. Alternatively, content consumers 130 may access the static faux Websites 119 or faux Webpages using a dedicated application, e.g., a viewer application via which the narrative presentation is presented. This "in app" approach can be implemented with a first user interface via which the narrative presentation is presented with associated controls (e.g., play, stop, pause, fast forward, rewind, branch selection) that allow the content consumer to control playback of the narrative presentation. This "in app" approach can be implemented with a second or more user interface, via which various social media experiences are provided. For instance, within the dedicated application, a second user interface may mimic a user interface similar to a social media network (e.g., FACEBOOK®). Also for instance, within the dedicated application, a third user interface may mimic a user interface similar to a photo sharing network (e.g., INSTAGRAM®, SNAPCHAT®, PINTEREST®). Also for instance, within the dedicated application, a fourth user interface may mimic a user interface similar to an audio-visual sharing network (e.g., YOUTUBE®, PERISOPE®, VIMEO®). This "in app" approach can be technically advantageous, providing a tighter connection with the progress of the individual content consumer through the narrative presentation.

Accessing the social media content 115 and the faux Web content 117 in conjunction with accessing the media content 113 may help the content consumer 130 to become more immersed in the narrative presentation 164 by providing details about character(s), story, locations, and/or events that are may be otherwise unavailable. The social media site 116 may also comprise social media profiles of, and created at least in part by, the content consumers 130. The content consumer profiles may include personal information about the content consumers 130, such as date of birth, interests, life event information, etc. As described below, the content consumer profiles may be used to personalize the content consumer 130 interaction with media content 113, the social media content 115, and/or the faux Web content 117.

The environment 100 may also include a content editor 180 that edits the media content 113 and the social media content 115, and creates relationships between media content 113 and the social media content 115, as described in further detail below.

In some implementations, the media content consumers 130 may access the narrative presentations 164 via one or more media content consumer processor-based devices 132. These media content consumer processor-based devices 132 can include, but are not limited to: televisions or similar image displays 132*a*, tablet computing devices 132*b*, smartphones and handheld computers 132*c*, desktop computers 132*d*, laptop and portable computers 132*e*, and wearable computers 132*f*. At times, a single media content consumer 130 may access a narrative presentation 164 across multiple devices and/or platforms. For example, a media content consumer may non-contemporaneously access a narrative presentation 164 using a plurality of media content consumer processor-based devices 132. For example, a media content consumer 130 may consume a narrative presentation 164 to a first point using a television 132*a* in their living room and then may access the narrative presentation at the first point using their tablet computer 132*b* or smartphone 132*c* as they ride in a carpool to work.

The media content consumer devices 132 may store a set of instructions 134 that, as a result of execution by one or more processors thereof, cause the content consumer devices 132 to perform various operations described herein. The set of instructions 134 may include, for instance, instructions organized into a presentation application 136 that processes data of the media content 113 and causes the corresponding media content 113 to be presented on one or more output devices of the content consumer devices 132 (e.g., display device, speaker, vibration). The set of instructions 134 may include instructions organized as a social media module 138 for presenting social media content 115 to the content consumer device 132. The social media module 138 include instructions that, as a result of being executed by the content consumer device 132, facilitate obtaining the social media content 115 from a static social media site 138. The static social media module 138 processes the social media content 115 and enables the content consumer 130 to experience and/or interact with social media content 115 on the content consumer device 132. As described herein, the static social media site 138 is a set of instructions that presents a curated collection of at least static faux social media content and faux Web content prepared by the supplemental content creators 120 to the user that has the appearance and feel of a dynamic social media site in which other users of the site create or influence what content is presented. The set of instructions 134 may further include an Internet browser module 139 for accessing faux Web content 117 or other content made available to the content consumer 130 via the Web server 160. The content consumer 130 may access the static faux Websites 119 by, for instance, typing in the appropriate address in the browser module 139, submitting an Internet search containing one or more defined keywords in the browser module 139, or selecting a link available within a Webpage displayed in the browser module 139. Using the browser module 139, the content consumers 130 can only access available faux Web content 117, which may not include Web content available via the Internet in the real-world using conventional Web browsers, such as Mozilla Firefox®, Google Chrome®, or Microsoft Internet Explorer®. The presentation application 136, social media module 138, and the browser module 139 may be part of a single application, or can be separate applications.

The presentation application 136, social media module 138, and the browser module 139 may provide a single user interface or separate user interfaces. For example, the presentation application can provide a first user interface with user selectable controls (e.g., play, pause, stop, rewind, branch selection, character selection, explorations of supplemental content) that operate the playback of the narrative presentation. Also for example, the social media module 138 may present one or more user interfaces, for instance user interfaces that mimic or are similar to user interfaces of commonly known real social media client applications. Also for example, the browser module 139 may present one or more user interfaces, for instance user interfaces that mimic or are similar to user interfaces of commonly known browsers (e.g., Internet Explorer®, Firefox®, Chrome®). In some implementations, the browsers may themselves be faux browsers, being dedicated applications that give the look and feel of a browser but which are retrieving search results and faux Webpages from a dedicated store of such on the client device or in the cloud, and not generally capable of searching the Worldwide Web. In other implementations, the browsers may themselves be real browsers, but restricted to a defined set of domains that are associated with the narrative presentations. Access to the defined set of domains may be restricted to browsers associated with the presentation viewer, or in some instances may be unlimited and discoverable on the Worldwide Web using standard Web browsers. The user interface may present various social media sites that replicate social media content attributable to a character in or related to the narrative presentation 164.

Although, the environment 100 and heretofore is described as being implemented using the Internet (e.g., network 140 includes the Internet), the environment 100 may be implemented using an extranet or other network. In some implementations, the set of instructions 134, once stored in memory of the content consumer device 132, may not require persistent access to the Internet to perform the operations described herein. Instead, a local network, extranet, mesh network, or other network may be used to implement presentation of the static social media sites 116 and media content 113. For example, one or more content consumer devices 132 of a single content consumer 130 storing the set of instructions 134, media content 113, static social media sites 116, etc. may operate in concert to provide the immersive media experience described herein. A first content consumer device 132 presenting the narrative presentation 164 (e.g., tablet) may send a communication to a second content consumer device 132 over a private network indicating that a certain progress point in the narrative presentation 164 has been reached. As a result, the second content consumer device 132 may notify the content consumer 130 that new social media content has just become available.

The environment 100 may comprise a platform 142 on which the set of instructions 134, the presentation application 136, the static social media module 138, and the browser module 139 are developed and hosted. The set of instructions 134 may be part of a single application in which the presentation application 136, the static social media module 138, and the browser module 139 are executed. The configuration of the single application may depend at least in part on the platform, operating system, or hardware configuration of the content consumer device 132. In some implementations, the platform 142 is a cloud-computing platform hosted by the Web server 160 which the content consumer device 132 can access over the network 140 to operate and interact with the presentation application 136, static social media module 138, and/or browser module 139.

The narrative presentation 164 may be stored in one or more nontransitory storage locations 152 associated with or coupled to the audio-visual media content system 150. The media content system 150, including the nontransitory storage locations 152, may be coupled to or accessible by a Web server 160 that provides a network accessible portal via network 140. In such an instance, the Web server 160 may stream the narrative presentation 164 to the media content consumer processor-based device(s) 132. For instance, the narrative presentation 164 may be presented to the media content consumer 130 on the media content consumer processor-based device 132 used by the media content consumer 130 to access the portal on the Web server 160 upon the receipt, authentication, and authorization of log-in credentials identifying the respective media content consumer 130. In some implementations, the entire narrative presentation 164, or portions thereof (e.g., narrative segments), may be retrieved on an as needed or as requested basis as discrete units (e.g., individual files), rather than streamed. In some implementations, the entire narrative presentation 164, or portions thereof, may be cached or stored on the media content consumer processor-based device 132, for instance before selection of specific narrative segments by the media content consumer 130. In some implementations, one or more content delivery networks (CDNs) may cache narratives at a variety of geographically distributed locations to increase a speed and/or quality of service in delivering narrative content of the narrative presentation 164.

The social media content 115, static social media site 116, the faux Web content 117, and the static faux Websites 119 may be stored in one or more nontransitory storage locations 172 associated with the or coupled to a supplemental media content system 170. The supplemental media content system 170, including the nontransitory storage locations 172, may be coupled to or accessible by a Web server 160 that provides a network accessible portal via network 140. In such an instance, the Web server 160 may provide the social media content 115, static social media site 116, the faux Web content 117, the static faux Websites 119, and/or the static faux Webpages 122 to the content consumer processor-based device(s) 132. For instance, the social media content 115 may be presented to the media content consumer 130 on the media content consumer processor-based device 132 used by the media content consumer 130 to access the portal on the Web server 160 upon the receipt, authentication, and authorization of log-in credentials identifying the respective media content consumer 130.

In some implementations, portions of the social media content 115 and the faux Web content 117 may be obtained from the supplemental media content system 170 based on content that has been provided to the media content consumer processor-based device(s) 132 in association with an account of the media content consumer 130. For instance, particular faux social media content or particular faux Web content may be accessible by the media content consumer 130 as a result of the consumer 130 progressing to a determined point in the narrative presentation 164. In some implementations, the entire social media content 115, or portions thereof, may be cached or stored on the media content consumer processor-based device 132, e.g., before selection of specific narrative segments of the narrative presentation 164 by the media content consumer 130. The media content consumer processor-based device 132 associated with the account of the media content consumer 130 may present one or more notifications indicating that previously unavailable social media content is available as a result of the consumer 130 progressing to a particular point or segment of the narrative presentation 164. In some implementations, one or more content delivery networks (CDNs) may cache social media content at a variety of geographically distributed locations to increase a speed and/or quality of service in delivery thereof.

A user account of the content consumer 130 may be stored in nontransitory data storage in the environment 100, such as data storage 162 communicably coupled to the Web server 160. The user account may include various information associated with the content consumer 130, such as user name, social media profile information (e.g., demographics, background), and progress information regarding a playback progress of the content consumer 130 in one or more narrative presentations 164. Access information 166 is associated with each user account defining a set of content, such as narrative segments 202, social media instances 118, and faux Webpages 122, that the content consumer 130 is allowed to access. The access information 166 may include identification information identifying content to which the content consumer 130 is granted access, and may include other information and/or restrictions.

The static social media site 116 and the static faux Website 119 may be accessible over the network 140 to the content consumer 130 by logging into a Website or by installing the set of instructions 134 on the one or more media content consumer devices 132. To prevent aspects of the narrative presentation 164 from being spoiled and undesirable posts containing spoilers, or lewd or unsavory content, for example, the static social media site 116 may be separate from and inaccessible via other social media platforms or networks (e.g., Facebook®, Twitter®, or Instagram®) or real-world Internet browsers. The faux Websites 119 may be separate from real-world internet sites and inaccessible without using the browser module 139. In some implementations, the social media site 116 and/or the static faux Websites 119 may be part of the same set of instructions via which the media content consumer 130 accesses the media content 113, or may be part of a separate set of instructions.

Figure 2:
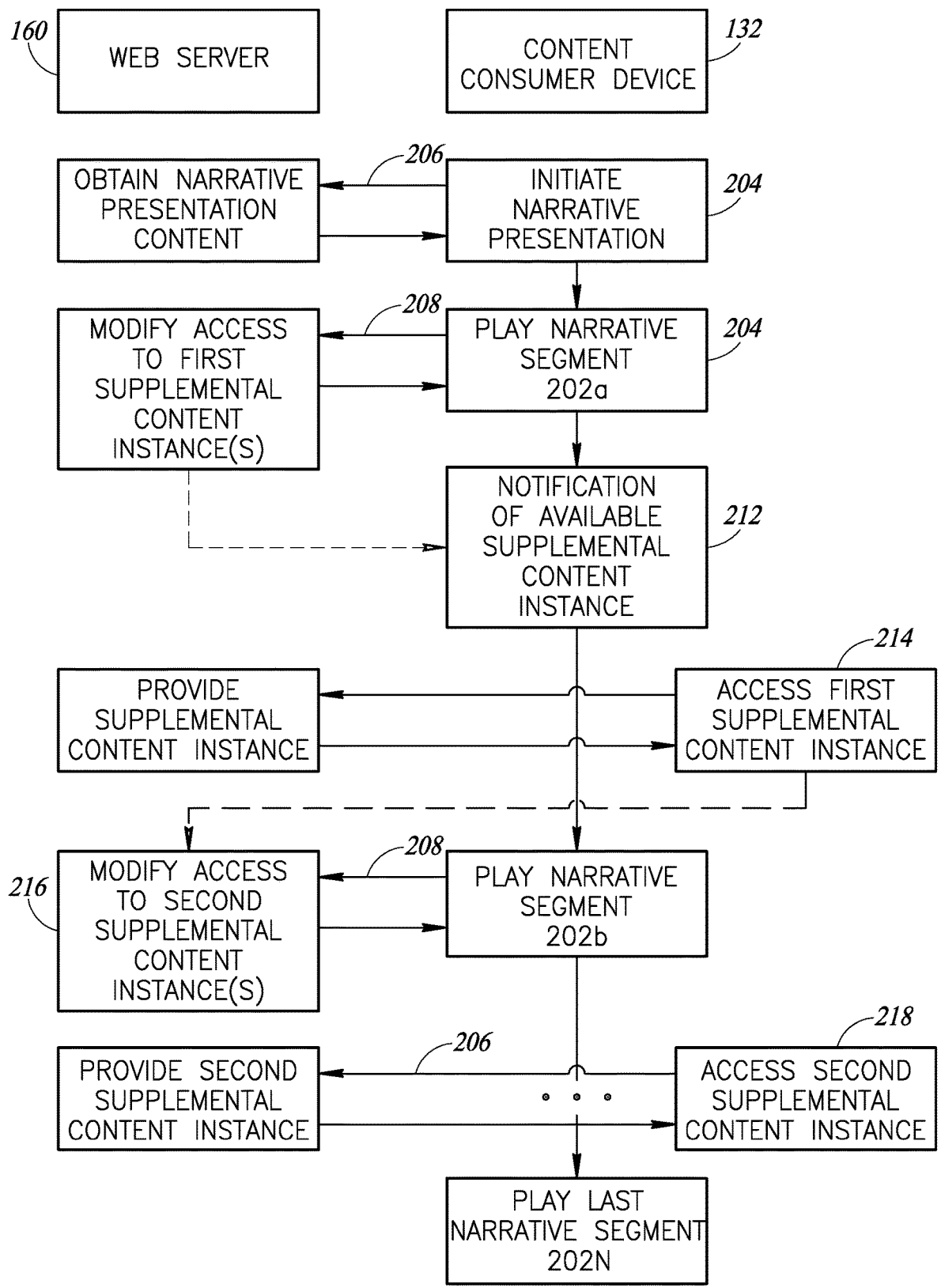
FIG. 2 is a flow diagram in which access to supplemental content is provided in connection with viewing a narrative presentation, according to at least one illustrated implementation.

FIG. 2 shows a method 200 to enable access to content supplemental to the audio-visual media content, such as the social media content 115 or the faux Web content 117, in connection with a content consumer 130 experiencing a production of a narrative presentation 164, according to at least one illustrated implementation.

The narrative presentation 164 comprises a number of narrative segments 202a-202N (collectively "narrative segments 202"), which may be sequentially ordered. The supplemental content includes social media instances 118 comprising social media content 115 (e.g., posts, videos, images, comments, profiles, requests to join a user's social network) and faux Webpages 122 comprising faux Web content 117. Supplemental content becomes accessible to the media content consumer 130 as a result of reaching particular progress points in the narrative presentation 164, or viewing or interacting with particular supplemental content. For instance, instances of social media content 115 are made accessible to the media content consumer 130 by virtue of the having progressed to a particular point in the narrative presentation 164. Also for instance, instances of social media content 115 are made accessible to the media content consumer 130 by virtue of the having made social media shares either via the faux Website 119 or via a static social media site 116.

The flow diagram 200 involves operations performed as a result of execution of the set of instructions 134 by one or more content consumer devices 132 that cause the content consumer device(s) 132 to at least present the media content 113, the social media content 115, and the faux Web content 117. The flow diagram 200 involves operations in which the content consumer device 132 interacts with one or more Web servers 160 to present the media content 113, the social media content 115, and/or the faux Web content 117 via the network 140. The content consumer device 132 may interact with the Web server 160 in response to an interaction received from a media consumer 130 or as a result of the content consumer device 132 identifying the occurrence of a defined event. The narrative presentation 164 may be an interactive presentation in which the media content consumer 130 selects or chooses, or at least influences, a path through the narrative presentation 164. User input by the content consumer 130 may be received via various input devices, including touchscreens, microphones, or controllers (e.g., mouse, joystick). In some implementations, the content consumer device 132 may interact with the Web server 160 by providing a communication including an indication of the progress of the narrative presentation 164 on the content consumer device 132.

The content consumer 130 may initiate 204 presentation of the media content 113 on the content consumer device 132 via the presentation application 136 in response to receiving an input on an input device, such as an input to begin playback of the narrative presentation 164. The content consumer device 132 then sends a communication 206 to the Web server 160 indicating initiation of the narrative presentation 164 by the media consumer 130. The communication 206 may include or be associated with data identifying the initiating media content consumer 130, which the Web server 160 may use to track the consumer's 130 progress in the narrative presentation 164 and supplemental content made available to, viewed by, or interacted with by the media content consumer 130. In response to the initiating input, the content consumer device 132 may begin presenting the media content to the media consumer 130 via one or more output devices of the content consumer device 132.

The set of instructions 134 executing on the content consumer device 132 may cause the content consumer device 132 to determine a current progress of presentation of the media content 113 and perform operations in association with the progress determined. Presentation progress of the media content progress may be based on information contained in the media content 113 itself. For instance, the media content 113 may include playback progress information indicating points of progress in the media presentation (e.g., timestamps, time codes) that, when reached during playback of the media content 113, cause or indicate to the consumer device 132 to perform one or more operations. The points of progress in the media content 113 may correspond to particular times in the media content 113, or the beginning, end, or intermediate points within the narrative segments 202. The playback progress information may include or be associated with other information, such as a type of event or an action to be performed. In some implementations, the set of instructions 134 may cause the content consumer device 132 to periodically determine the playback progress of the media content 113 instead of, or in addition to, detecting the playback progress information.

The content consumer device 132 sends, either periodically or in response to detecting a particular point in playback of the media content 113, a communication 208 indicating the progress of the narrative presentation 164 based on the playback progress information. As an example, playback progress information corresponding to a first segment 202a may be detected as a result of presentation of the first segment 202a of the narrative presentation 164. In response, the content consumer device 132 sends the communication 208 to the Web server 160 indicating that playback of the narrative presentation 164 has progressed to a certain point or time. The communication 208 includes progress information indicating playback progress of the content consumer 130 in the narrative presentation 164 or in a particular narrative segment 202, and may include information identifying the first segment 202a of the narrative presentation. The progress information may include a timestamp indicating an elapsed time of playback in the narrative presentation 164 or narrative segment 202, or indicating the occurrence of an event in the narrative presentation 164 or narrative segment 202.

Communications from the content consumer device 132, such as the communication 208, may include additional information. For instance, the communications may include identity information identifying the content consumer 130 viewing the media content 113, such as an account number or user name. The communications may include system information regarding aspects of the hardware or software of the content consumer device 132. The system information may identify the device type of the content consumer device 132 (e.g., television, tablet computer, smartphone) and may further identify a model of the content consumer device 132. The system information may also include information useable to identify an operating system of the device, such as Android®, iOS®, or tvOS®.

The Web server 160 may process the communication 208 and determines which, if any, operations should be performed in response. The Web server 160 obtains the playback progress information and identification information of the content consumer 130 from the communication 208. Based at least in part on the playback progress information obtained, the Web server 160 may determine one or more content instances of the supplemental content to make available for access by the content consumer 130. The supplemental content made available may include social media instances 118, faux Webpages 122, or both. The Web server 160 may determine whether to provide access.

The social media content instances 118 correspond to a set of social media content, such as audio-visual segments or files, images, sound, text, links, pages, character or entity profiles, or hashtags, by way of non-limiting example. The content of the social media instances 118 relate to events, characters, locations, or other content of or associated with the media content 113. Faux Webpages 122 include articles, videos, educational content, and background information relating to the events, characters, locations, or other content of or associated with the media content 113. One limitation of video media is that it is sometimes difficult to adequately explain details regarding a plot or a character's inner thoughts without disrupting the flow of the narrative. Accessing the social media instances 118 in connection with viewing the media content 113 helps to immerse the content consumer 130 in the narrative presentation 164 by providing a more detailed and multi-dimensional experience in which parallel events, background, locations, characters, and thoughts of the characters may be explained. Social media is particularly appropriate for this purpose, for example, because of its prominence in present day society, the ability of users to access social media content at their convenience, and the myriad forms of media types it can convey. Accessing faux Webpages 122 can similarly help to provide a more immersive experience to the content consumer 130 by providing context and details about characters, places, or events without disrupting the flow of the narrative presentation 164. Moreover, for at least some available faux Webpages 122, the content consumer 130 may have to search for or access the faux Webpages 122 in a particular way, providing the content consumer 130 with a sense that they are actively engaged with the narrative presentation 164.

The supplemental content may correspond to the content that would have been shared by a character in the narrative presentation 164. Which supplemental content the Web server 160 determines to make available for access may be based on a data structure stored in data storage that indicates an association of the playback progress information with a corresponding social media instance 118 or faux Webpage 122. In some implementations, the data structure may be a relational model, such as a referential table, stored in memory that indicates an association between playback progress and one or more instances of supplemental content. In some implementations, the data structure may be a hash table or hash map in which a key is mapped to a value stored in a particular location in data storage accessible by the Web server 160—for example, wherein identifying the social media instance 118 to be made available is obtained from a data storage location identified by performing a hash function using the playback progress information as input.

The Web server 160 causes the determined supplemental content to be made available for the content consumer 130 to access. In some implementations, to make the supplemental content available, the Web server 160 may modify permissions associated with the media consumer 130, or particular instances of the supplemental content (e.g., a particular social media instance 118a) to allow the media consumer 130 access. Modifying permissions may include issuing an instruction for modifying or inserting an entry in a permissions data structure (e.g., directory, reference table) stored in data storage allowing the particular media consumer 130 access to the supplemental content instance(s). In some implementations, the Web server 160 may send a digital token encoding authentication information for allowing the particular content consumer 130 to access the supplemental content instance 118*a* as a result of presenting the token to an authorized entity, such as the Web server 160. The supplemental content instance made available to the content consumer 130 may be accessed from any device on which the consumer is logged into the application (i.e., set of instructions 134). Moreover, the content consumer 130 may access social media content 115, faux Web content 117, and media content 113 contemporaneously on the same or different content consumer devices 132. For instance, the content consumer 130 may pause playback of the media content 113 on a first content consumer device 132, such as a television, and then access social media content 115 on a second content consumer device 132, such as a tablet computer.

The Web server 160 may send a communication 210 to the content consumer device 132 regarding one or more supplemental content instances that have become available for access. The communication 210 may include information about the content of the supplemental content instance, such as a type of the content (e.g., image, audio-visual, text) and identification information regarding the person or entity posting the content. The communication 210 may also include a link identifying a location of the content. The communication 210 may cause the content consumer device 132 to present a notification 212 on one or more output devices (e.g., display, speaker, vibration) to the content consumer 130 indicating that one or more supplemental content instances have become available. The notification 212 may include a selectable link corresponding to the link provided by the Web server 160. Selection of the link by the content consumer 130, in some instances, causes the content consumer device 132 to switch from the presentation application 136 to a different application, such as the social media module 138 or the browser module 139.

The information included in the communication 210 may depend on the system information provided by the content consumer device 132 in a previous communication, such as the communication 208. The Web server 160 may determine whether to provide access to the supplemental content based on the operating system of the content consumer device 132. As a result of determining that the content consumer device 132 is running an iOS operating system, for instance, the Web server 160 may provide a communication to the content consumer device 132 causing the supplemental content (e.g., a social media instance) to be presented within the presentation application 136. On the other hand, the Web server 160 may provide a communication that causes the consumer device 132 to display a selectable link in the presentation application 136, the selection of which causes the consumer device 132 to switch to a different application. The different application may be the social media module 138, the Internet browser module 139, or an external application, such as Facebook® or Google Chrome®.

In some implementations, the content consumer device 132 may provide a notification 212 to the content consumer 130 regarding social media instances 118 that have become available. In some instances, the content consumer device 132 may not provide notification 212 to the content consumer 130 regarding at least some faux Webpages 122 that have become available, which helps to keep the content consumer 130 actively engaged and searching for newly available faux Webpages 122.

The content consumer 130 may then access 214 a supplemental content instance, such as a social media instance 118, on one or more content consumer devices 132 that are associated with identification information of the content consumer 130. The identification information may correspond to a user account of the content consumer 130 that logged in to an application or program of the set of instructions 134 for accessing the Web server 160, the media content 113, and the social media content 115. The content consumer 130 may select the notification 212 or navigate through a user interface of the application to access the supplemental content instance.

Accessing 214 the supplemental content instance may include sending a request by the content consumer device 132 to the Web server 160 to access the supplemental content instance. For instance, a content consumer 130 may send a request to the Web server 160 to access to a social media instance. The Web server 160 may provide access to the supplemental content instance based on one or more factors including access parameters of the content consumer 130 and the application from which the request was sent. The Webserver 160 may provide access to the requested social media instance 118 on the static social media site 116 based on a determination that the request was sent using the set of instructions 134. Otherwise, the Webserver 160 may provide access to a corresponding social media instance on a different application, such as a dynamic social media application or a dynamic social media Website on a third party Web browser, as a result of determining that the request was generated or provided from an outside application—that is, an application other than the set of instructions 134.

In some implementations, the content of the supplemental content instances may be sent to the content consumer device 132 in the communication 210. In some implementations, the supplemental content instances are stored in data storage remotely located from the content consumer device 132 and provided to the content consumer device 132 on demand in a communication separate from the communication 210. For instance, the content consumer device 132 may send a request to the Webserver 160 for a social media instance 118. The request may be generated in response to a user action interacting with the content consumer device 132, such as by opening the application for accessing the social and/or media content, interacting with the user interface of the application, or interacting with the notification 212 regarding the social media instances 118. The request may include information identifying the content consumer 130 or may include the digital token encoding authentication information. The Webserver 160 may process the request to determine whether the content consumer 130 is authorized to access the social media instance 118 requested. The Web server 160 may then obtain the social media instances 118, if authorized, and send a communication to the content consumer device 132 including the requested social media instance 118.

The Webserver 160 may, in some implementations, send supplemental content instances to the content consumer device 132 when new supplemental content instances become available. For instance, in response to receiving the communication 208 indicating playback progress to a defined point of progress, the Web server 160 may obtain any social media instances 118 and/or faux Webpages 122 that it determines should be accessible to the content consumer 130, and send those social media instances 118 to the content consumer device 132.

In some implementations, the Web server 160 may send all or most of the supplemental content instances to one or more content consumer devices 132 at or before beginning playback of the media content 113. The set of instructions 134 make a set of the supplemental content instances available for access to the content consumer 130 upon the media content 113 progressing to predetermined progress points corresponding to the set of supplemental content instances. This may be useful where the content consumer 130 anticipates being in an offline setting such that the content consumer device 132 may have intermittent, limited, or no access to the communications networks 140. The supplemental content instances may be encoded in communications using one or more encryption protocols for secure communications (e.g., Digital Signature Algorithm). The supplemental content instances may be decoded upon progression to corresponding playback points to prevent the content consumer 130 from prematurely accessing instances of supplemental content.

Additional instances of supplemental content may become available as a result of progressing through the narrative presentation 164. For instance, a social media instance(s) 118b may become available to the content consumer 130 as a result of progressing playback of the narrative presentation 164 to a narrative segment 202b after the narrative segment 202a. Whether the Web server 160 makes the additional social media instance(s) 118b available to the content consumer 130 may depend on what content in the narrative presentation and, or the social media content 118a the content consumer 130 has viewed.

Additional instances of the supplemental content may become available as a result of accessing or interacting with currently available supplemental content instances. As shown in the flowchart 200, the Web server 160 may make additional content instances available to the content consumer 130 as a result of the content consumer 130 accessing or interacting with available supplemental content instances. In 214, the content consumer 130 may access an available supplemental content instance, such as by selecting a user interface feature for viewing or interacting with the content instance. Accessing may include viewing all or a portion of an available content instance, such as by commenting on, reposting (e.g., "retweeting"), providing a reaction (e.g., "liking") to a social media instance 218 or sending a message or social network request to a character, organization, or entity on the social media site 116.

As a result of accessing 214 the supplemental content instance, the Web server 160 may enable an additional content instance to become available in 216. The additional content instance(s) may relate to the available content instance accessed in 214. For example, an additional social media content instance 118b may be a comment, photograph, etc., purportedly posted by or involving the topic of a previous social media content 118a.

In some instances, the content consumer 130 may have to access 214 the available supplemental content instance in a particular way to make additional content instance(s) available. For instance, for the Web server 160 to provide access to some additional social media instances, the content consumer 130 may have to post a comment to an available social media instance 118a containing certain keywords or phrases.

In some implementations, the set of instructions 134 may enable the content consumer 130 to interact with an external social media platform unaffiliated with production of the media content 113 and the social media content 115. The external social media platform may be social media well-known in the real world—for instance, "Facebook®," "Twitter®," "Instagram®." The set of instructions 134 may allow users, such as the content consumer 130, to post 214 or share select portions of the social media content 115 to the external social media platform. Some portions of the social media content 115, on the other hand, may be off-limits from posting to the external social media platform to prevent the content contained therein from spoiling content for other users. The set of instructions 134 may include programming that disables or limits the ability of the content consumer device 132 to take a screenshot during execution of the set of instructions 134 (i.e., while the application is running) to prevent spoliation of media content 113 and social media content 115 or the overall experience.

The content consumer 130 may continue viewing additional segments 202 of the narrative presentation 164 until the content consumer 130 completes the narrative presentation 164 at the last narrative segment 202N. The content consumer device 132 may send a communication to the Web server 160 indicating that the content consumer 130 has completed viewing of the narrative segment 164. Accordingly, the Web server 160 may make some or all of the previously unavailable social media content 115 and/or faux Web content 117 available to the content consumer 130.

Figure 3:
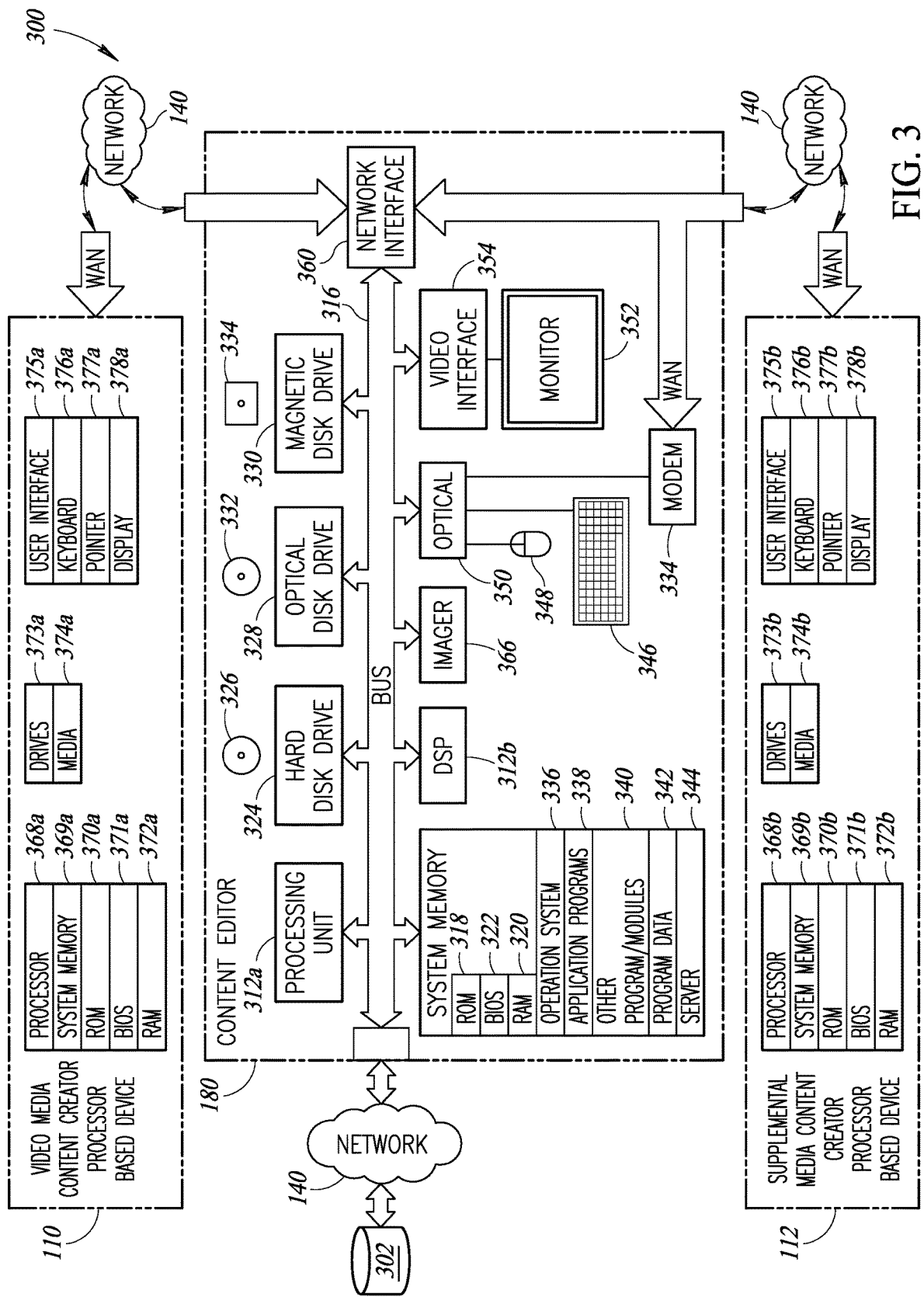
FIG. 3 is a simplified block diagram of an illustrative content editor, according to at least one illustrated implementation.

FIG. 3 shows a networked content editing system environment 300 in which and media content and supplemental content respectively provided by the media content creators 110 and the supplemental content creators 120 is edited and organized, according to at least one illustrated implementation.

The content provisioning system environment 300 includes the content editor 180 that refines the media content 113 into a number of narrative segments 202 and logically assembles the finished narrative segments 202 into the narrative presentation 164. The content editor 180 also logically associates instances 118 of the social media content 115 with playback progress points in the narrative presentation 164. The content editor 180 may also set permissions for accessing social media instances 118 and the faux Webpages 122. A production team, an editing team, or a combined production and editing team are responsible for refining and assembling the finished narrative segments 202 into a narrative presentation 164 in a manner that maintains the artistic integrity of the narrative segment sequences included in the narrative presentation 164. The narrative presentation 164 is provided to media content consumer processor-based devices 132 either as a digital stream via network 140, a digital download via network 140, or stored on one or more non-volatile storage devices such as a compact disc, digital versatile disk, thumb drive, or similar. The team is also responsible for determining which social media instances 118 and/or webpages 122 are to be associated with which segments 202 of the narrative presentation 164. In some implementations, the social media instances 118 are considered to be part of the narrative presentation 164 such that the social media instances 118 are presented to the content consumer 130 between narrative segments 202, as described below.

The content editor 180 may create relational associations between the social media instances 118, the faux Webpages 122, and the narrative segments 202. After generating a narrative segment 202, the team may operate the content editor 180 to determine which, if any, social media instances 118 or faux Webpages 122 a content consumer 130 will be granted access to as a result of viewing the narrative segment 202 or a portion thereof (e.g., beginning, end, or intermediate point of the narrative segment). The content editor 180 may be operated to generate a data structure defining relational associations between the narrative segments 202 and the social media instances 118, between the narrative segments 202 and the faux Webpages 122, or between the social media instances 118 and the faux Webpages 122. The data structure is useable to determine which social media instances 118 or faux Webpages 122 a content consumer 130 may access upon progressing to the narrative segment 202 determined. The content editor 180 may store the data structure in data storage, such as a processor readable storage medium 302 communicably coupled to the content editor 180.

The content editing system processor-based device 180 includes one or more processor-based editing devices 180 (only one illustrated) and one or more communicably coupled nontransitory computer- or processor readable storage medium 302 (only one illustrated) for storing and editing media content obtained from the content creators 110 into finished narrative segments 202 that are assembled into the narrative presentation 164, or supplemental content from the content creators 120 into finished social media instances 118 and faux Webpages 122. The associated nontransitory computer- or processor readable storage medium 302 may be communicatively coupled to the one or more processor-based devices 180 via one or more communications channels. The one or more communications channels may include one or more physical connections such as parallel cables, serial cables, universal serial bus ("USB") cables, THUNDERBOLT® cables, or one or more wireless channels capable of digital data transfer—for instance, near field communications ("NFC"), FIREWIRE®, or BLUETOOTH®.

The one or more media content creator processor-based device(s) 110 and the one or more supplemental content creator processor-based devices 112 are communicatively coupled to the content editing system processor-based device 180 by one or more communications channels, for example one or more wide area networks (WANs) 140. In some implementations, the one or more WANs may include one or more worldwide networks, for example the Internet, and communications between devices may be performed using standard communication protocols, such as one or more Internet protocols. In operation, the one or more media content creator processor-based device(s) 110 and the one or more supplemental content creator processor-based devices 112 function as either a server for other computer systems or processor-based devices associated with a respective entity or themselves function as computer systems. In operation, the content editing system processor-based device 180 may function as a server with respect to the one or more media content creator processor-based device(s) 110 and/or the one or more supplemental content consumer processor-based devices 112. The content editor 180 obtains the media content 113 and the social media content 115 respectively from the media content creator 110 and the supplemental media content creator 112 over a period of time and stores the content in data storage (e.g., audio-visual content storage 150, supplemental content storage 170, storage medium 302).

The networked content editing system environment 300 may employ other computer systems and network equipment, for example additional servers, proxy servers, firewalls, routers and/or bridges. The content editing system processor-based device 180 is at times referred to in the singular herein, but this is not intended to limit the embodiments to a single device since in typical embodiments there may be more than one content editing system processor-based device 180 involved. Unless described otherwise, the construction and operation of at least some of the various blocks shown in FIG. 3 are known to those skilled in the relevant art, and are not described in further detail herein for the sake of brevity.

The content editing system processor-based device 180 may include one or more processing units 312 capable of executing processor-readable instruction sets to provide a dedicated content editing system, a system memory 314 and a system bus 316 that couples various system components including the system memory 314 to the processing units 312. The processing units 312 include any logic processing unit capable of executing processor- or machine-readable instruction sets or logic. The processing units 312 maybe in the form of one or more central processing units (CPUs), digital signal processors (DSPs), application-specific integrated circuits (ASICs), reduced instruction set computers (RISCs), field programmable gate arrays (FPGAs), logic circuits, systems on a chip (SoCs), etc. The system bus 316 can employ any known bus structures or architectures, including a memory bus with memory controller, a peripheral bus, and/or a local bus. The system memory 314 includes read-only memory ("ROM") 318 and random access memory ("RAM") 320. A basic input/output system ("BIOS") 322, which can form part of the ROM 318, contains basic routines that help transfer information between elements within the content editing system processor-based device 180, such as during start-up.

The content editing system processor-based device 180 may include one or more nontransitory data storage devices. Such nontransitory data storage devices may include one or more hard disk drives 324 for reading from and writing to a hard disk 326, one or more optical disk drives 328 for reading from and writing to removable optical disks 332, and/or one or more magnetic disk drives 330 for reading from and writing to magnetic disks 334. Such nontransitory data storage devices may additionally or alternatively include one or more electrostatic (e.g., solid-state drive or SSD), electroresistive (e.g., memristor), or molecular (e.g., atomic spin) storage devices.

The optical disk drive 328 may include a compact disc drive and/or a digital versatile disk (DVD) configured to read data from a compact disc 332 or DVD 332. The magnetic disk 334 can be a magnetic floppy disk or diskette. The hard disk drive 324, optical disk drive 328 and magnetic disk drive 330 may communicate with the processing units 312 via the system bus 316. The hard disk drive 324, optical disk drive 328 and magnetic disk drive 330 may include interfaces or controllers (not shown) coupled between such drives and the system bus 316, as is known by those skilled in the relevant art. The drives 324, 328 and 330, and their associated computer-readable media 326, 332, 334, provide nonvolatile storage of computer-readable instructions, data structures, program modules and other data for the content editing system processor-based device 180. Although the depicted content editing system processor-based device 180 is illustrated employing a hard disk drive 324, optical disk drive 328, and magnetic disk drive 330, other types of computer-readable media that can store data accessible by a computer may be employed, such as WORM drives, RAID drives, flash memory cards, RAMs, ROMs, smart cards, etc.

Program modules used in editing and assembling the narrative segments 202, social media instances 118, and faux Webpages 122 provided by the content creators 110 and 120 are stored in the system memory 314. These program modules include modules such as an operating system 336, one or more application programs 338, other programs or modules 340 and program data 342.

Application programs 338 may include logic, processor-executable, or machine executable instruction sets that cause the processor(s) 312 to automatically receive raw narrative segments, raw social media content, and raw faux Web content, and communicate finished narrative presentations 164, social media instances, and Webpages to a Web Server (e.g., Web server 160) functioning as a portal or storefront where media content consumers 130 are able to digitally access and acquire the narrative presentations 164, the social media content 115. Any current (e.g., CSS, HTML, XML) or future developed communications protocol may be used to communicate the finished content to and from local and/or remote nontransitory storage 152 as well as to communicate narrative presentations 164, social media instances 118, and/or the faux Webpages 122 to the Web server 160.

Application programs 338 may include any current or future logic, processor-executable instruction sets, or machine-executable instruction sets that facilitate the editing, alteration, or adjustment of one or more human-sensible aspects (sound, appearance, feel, taste, smell, etc.) of the raw narrative segments into finished narrative segments 202 by the editing team or the production and editing teams.

Application programs 338 may include any current or future logic, processor-executable instruction sets, or machine-executable instruction sets that facilitate the assembly of finished narrative segments 202 into a narrative presentation 164. Such may include, for example, a narrative assembly editor (e.g., a "Movie Creator") that permits the assembly of finished narrative segments 202 into a narrative presentation 164 at the direction of the editing team or the production and editing teams. Application programs 338 may include any current or future logic, processor-executable instruction sets, or machine-executable instruction sets that facilitate the content consumer 130 to access social media instances 118 or faux Webpages 122 in connection with viewing the associated narrative segments 202. Such may include instructions that facilitate the creation of prompts or notifications that appear either during the pendency of or at the conclusion of narrative segments 202. Such may include instructions that facilitate the selection of presentation formats (e.g., split screen, tiles, or lists, among others) for the social media instances 118 to appear either during the pendency of or at the conclusion of narrative segments 202, including on the same or a different processor-based device). Such may include instructions that facilitate the creation of logical or Boolean expressions or conditions that autonomously and/or dynamically create or selection icons for inclusion in the prompts or notifications that appear either during the pendency of or at the conclusion of narrative segments 202. At times, such logical or Boolean expressions or conditions may be based in whole or in part on inputs representative of actions or selections taken by media content consumers 130 prior to or during the presentation of the narrative presentation 164.

Such application programs may include any current or future logic, processor-executable instruction sets, or machine-executable instruction sets that provide for choosing a social media instance 118 from a set of social media instances 118 associated with a playback progress point or narrative segment 202 of the narrative presentation 164. Such application programs may also include any current or future logic, processor-executable instruction sets, or machine-executable instruction sets that provide for accessing a faux Webpage 122 using a search engine or browser encoded in the set of instructions 134. In some implementations, for each playback progress point or narrative segment 202, a set of one or more selection parameters may be associated with each social media instance 118 or faux Webpage 122. The selection parameters may determine which instances of a set of social media instances 118 or a set of faux Webpages 122 the content consumer 130 is allowed to access as a result of reaching the playback progress point. The selection parameters may be related to information regarding which social media instances 118 or faux Webpages 122 the content consumer 130 has viewed, interactions with social media instances 118 or faux Webpages 122 by the content consumer 130, and restrictions on the social media instances 118 or faux Webpages 122 (e.g., age restrictions), by way of non-limiting example. Each of the selection parameters may have associated values or information that the application program may compare with collected information associated with the media content consumer 130 to determine which of the set of social media instances 118 or which of the set of faux Webpages 122 to make available to the media content consumer 130.

The application programs may include any current or future logic, processor-executable instruction sets, or machine-executable instruction sets that facilitate providing media content consumers 130 with access to non-selected narrative segments 202. Such may include logic or Boolean expressions or conditions that include data representative of the interaction of the respective media content consumer 130 with one or more third parties, one or more narrative-related Websites, and/or one or more third party Websites. Such instructions may, for example, collect data indicative of posts made by a media content consumer 130 on one or more social networking Websites as a way to encouraging online discourse between media content consumers 130 regarding the narrative presentation 164.

Such application programs may include any current or future logic, processor-executable instruction sets, or machine-executable instruction sets that facilitate the collection and generation of analytics or analytical measures related to the social media instances 118 or faux Webpages 122 viewed or interacted with by media content consumers 130. Such may be useful for identifying a "most popular" social media instances 118 or faux Webpages 122, "least viewed" social media instances or faux Webpages 122, time spent viewing or interacting with social media instances 118 or faux Webpages 122, etc.

Other program modules 340 may include instructions for handling security such as password or other access protection and communications encryption. The system memory 314 may also include communications programs, for example a server that causes the content editing system processor-based device 180 to serve electronic or digital documents or files via corporate intranets, extranets, or other networks as described below. Such servers may be markup language based, such as Hypertext Markup Language (HTML), Extensible Markup Language (XML) or Wireless Markup Language (WML), and operate with markup languages that use syntactically delimited characters added to the data of a document to represent the structure of the document. A number of suitable severs may be commercially available such as those from MOZILLA®, GOOGLE®, MICROSOFT®, and APPLE COMPUTER®.

While shown in FIG. 3 as being stored in the system memory 314, the operating system 336, application programs 338, other programs/modules 340, program data 332 and browser 344 may be stored locally, for example on the hard disk 326, optical disk 332 and/or magnetic disk 334. At times, other programs/modules 340, program data 332 and browser 344 may be stored remotely, for example on one or more remote file servers communicably coupled to the content editing system processor-based device 180 via one or more networks such as the Internet.

One or more team members enter commands or data into the content editing system processor-based device 180 using one or more input devices such as a touch screen or keyboard 346 and/or a pointing device such as a mouse 348, and/or via a graphical user interface ("GUI"). Other input devices can include a microphone, joystick, game pad, tablet, scanner, etc. These and other input devices are connected to one or more of the processing units 312 through an interface 350 such as a serial port interface that couples to the system bus 316, although other interfaces such as a parallel port, a game port or a wireless interface or a Universal Serial Bus ("USB") can be used. A monitor 352 or other display device couples to the system bus 316 via a video interface 354, such as a video adapter. The content editing system processor-based device 180 can include other output devices, such as speakers, printers, etc.

The content editing system processor-based device 180 can operate in a networked environment using logical connections to one or more remote computers and/or devices. For example, the content editing system processor-based device 180 can operate in a networked environment using logical connections to one or more media content creator processor-based devices 110 or one or more supplemental content creator processor-based devices 112. Communications may be via tethered and/or wireless network architecture, for instance combinations of tethered and wireless enterprise-wide computer networks, intranets, extranets, and/or the Internet. Other embodiments may include other types of communications networks including telecommunications networks, cellular networks, paging networks, and other mobile networks. There may be any variety of computers, switching devices, routers, bridges, firewalls and other devices in the communications paths between the content editing system processor-based device 180 and the one or more media content creator processor-based devices 110 and the one or more supplemental content creator processor-based devices 112.

The one or more media content creator processor-based devices 110 and the one or more supplemental content creator processor-based devices 112 will typically take the form of processor-based devices, for instance personal computers (e.g., desktop or laptop computers), netbook computers, tablet computers and/or smartphones and the like, executing appropriate instructions. At times, the one or more media content creator processor-based devices 110 and the one or more supplemental content creator processor-based devices 112 may include still or motion picture cameras or other devices capable of acquiring data representative of human-sensible data (data indicative of sound, sight, smell, taste, or feel) that are capable of directly communicating data to the content editing system processor-based device 180 via network 140. At times, some or all of the one or more media content creator processor-based devices 110 and the one or more supplemental content creator processor-based devices 112 may communicably couple to one or more server computers. For instance, the one or more media content creator processor-based devices 110 and the one or more supplemental content creator processor-based devices 112 may communicably couple via one or more remote Web servers that include a data security firewall. The server computers may execute a set of server instructions to function as a server for a number the one or more media content creator processor-based devices 110 and/or a number of the one or more supplemental content creator processor-based devices 112 (i.e., clients) communicatively coupled via a LAN at a facility or site. The one or more media content creator processor-based devices 110 and the one or more supplemental content creator processor-based devices 112 may execute a set of client instructions and consequently function as a client of the server computer(s), which are communicatively coupled via a WAN.

The one or more media content creator processor-based devices 110 and the one or more supplemental content creator processor-based devices 112 may each include one or more processing units 368a, 368b (collectively "processing units 368"), system memories 369a, 369b (collectively, "system memories 369") and a system bus (not shown) that couples various system components including the system memories 369 to the respective processing units 368. The one or more media content creator processor-based devices 110 and the one or more supplemental content creator processor-based devices 112 will at times each be referred to in the singular herein, but this is not intended to limit the embodiments to a single media content creator processor-based device 110 or social media content creator processor-based device 112. In typical embodiments, there may be more than one or more media content creator processor-based devices 110 and the one or more supplemental content creator processor-based devices 112. Additionally, one or more intervening data storage devices, portals, and/or storefronts not shown in FIG. 3 may be present between the content editing system processor-based device 180 and at least some of the one or more media content creator processor-based devices 110 and the one or more supplemental content creator processor-based devices 112.

The processing units 368 may be any logic processing unit, such as one or more central processing units (CPUs), digital signal processors (DSPs), application-specific integrated circuits (ASICs), logic circuits, reduced instruction set computers (RISCs), field programmable gate arrays (FPGAs), etc. Non-limiting examples of commercially available computer systems include, but are not limited to, an i3, i5, and i7 series microprocessors available from Intel Corporation, U.S.A., a Sparc microprocessor from Sun Microsystems, Inc., a PA-RISC series microprocessor from Hewlett-Packard Company, an A4, A6, or A8 series microprocessor available from Apple Computer, or a Snapdragon processor available from Qualcomm Corporation. Unless described otherwise, the construction and operation of the various blocks of the devices 110 and 112 are of conventional design. As a result, such blocks need not be described in further detail herein, as they will be understood by those skilled in the relevant arts.

The system bus can employ any known bus structures or architectures, including a memory bus with memory controller, a peripheral bus, and a local bus. The system memory 369 includes read-only memory ("ROM") 370a, 370b (collectively 370) and random access memory ("RAM") 372a, 372b (collectively 372). A basic input/output system ("BIOS") 371a, 371b (collectively 371), which can form part of the ROM 370, contains basic routines that help transfer information between elements within the one or more media content creator processor-based devices 110 and the one or more supplemental content creator processor-based devices 112, such as during start-up.

The one or more media content creator processor-based devices 110 and the one or more supplemental content creator processor-based devices 112 may also include one or more media drives 373a, 373b (collectively 373), e.g., a hard disk drive, magnetic disk drive, WORM drive, and/or optical disk drive, for reading from and writing to computer-readable storage media 374a, 374b (collectively 374), e.g., hard disk, optical disks, and/or magnetic disks. The computer-readable storage media 374 may, for example, take the form of removable non-transitory storage media. For example, hard disks may take the form of a Winchester drives, and optical disks can take the form of CD-ROMs, while electrostatic nontransitory storage media may take the form of removable USB thumb drives. The media drive(s) 373 communicate with the processing units 368 via one or more system buses. The media drives 373 may include interfaces or controllers (not shown) coupled between such drives and the system bus, as is known by those skilled in the relevant art. The media drives 373, and their associated computer-readable storage media 374, provide nonvolatile storage of computer readable instructions, data structures, program modules and other data for the one or more media content creator processor-based devices 110 and the one or more supplemental content creator processor-based devices 112. Although described as employing computer-readable storage media 374 such as hard disks, optical disks and magnetic disks, those skilled in the relevant art will appreciate that the one or more media content creator processor-based devices 110 and the one or more supplemental content creator processor-based devices 112 may employ other types of computer-readable storage media that can store data accessible by a computer, such as flash memory cards, digital video disks ("DVD"), RAMs, ROMs, smart cards, etc. Data or information, for example, electronic or digital documents or files or data (e.g., metadata, ownership, authorizations) related to such can be stored in the computer-readable storage media 374.

Program modules, such as an operating system, one or more application programs, other programs or modules and program data, can be stored in the system memory 369. Program modules may include instructions for accessing a Website, extranet site or other site or services (e.g., Web services) and associated Webpages, other pages, screens or services hosted by components communicatively coupled to the network 140.

Program modules stored in the system memory the one or more media content creator processor-based devices 110 and the one or more supplemental content creator processor-based devices 112 include any current or future logic, processor-executable instruction sets, or machine-executable instruction sets that facilitate the collection and/or communication of data representative of raw narrative segments or raw social media content to the content editing system processor-based device 180. Such application programs may include instructions that facilitate the compression and/or encryption of data representative of raw narrative segments or raw social media content prior to communicating the data representative of the raw narrative segments and/or raw social media content to the content editing system processor-based device 180.

Program modules stored in the system memory of the one or more media content creator processor-based devices 110 and the one or more supplemental content creator processor-based devices 112 include any current or future logic, processor-executable instruction sets, or machine-executable instruction sets that facilitate the editing of data representative of raw narrative segments, raw social media content, or raw faux Web content. For example, such application programs may include instructions that facilitate the partitioning of a longer narrative segment 202 into a number of shorter duration narrative segments 202, or raw social media content into a number of shorter social media content data objects.

The system memory 369 may also include other communications programs, for example a Web client or browser that permits the one or more media content creator processor-based devices 110 and the one or more supplemental content creator processor-based devices 112 to access and exchange data with sources such as Web sites of the Internet, corporate intranets, extranets, or other networks. The browser may, for example be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 369, the operating system, application programs, other programs/modules, program data and/or browser can be stored on the computer-readable storage media 374 of the media drive(s) 373. Users of the one or more media content creator processor-based devices 110 and the one or more supplemental content creator processor-based devices 112 may enter commands and information into the one or more media content creator processor-based devices 110 and the one or more supplemental content creator processor-based devices 112, respectively, via a user interface 375*a*, 375*b* (collectively "user interface 375") through input devices such as a touch screen or keyboard 376*a*, 376*b* (collectively "input devices 376") and/or a pointing device 377*a*, 377*b* (collectively "pointing devices 377") such as a mouse. Other input devices can include a microphone, joystick, game pad, tablet, scanner, etc. These and other input devices are connected to the processing unit 369 through an interface such as a serial port interface that couples to the system bus, although other interfaces such as a parallel port, a game port or a wireless interface or a universal serial bus ("USB") can be used. A display or monitor 378*a*, 378*b* (collectively 378) may be coupled to the system bus via a video interface, such as a video adapter. The one or more media content creator processor-based devices 110 and the one or more supplemental content creator processor-based devices 112 can include other output devices, such as speakers, printers, etc.

Figure 4:
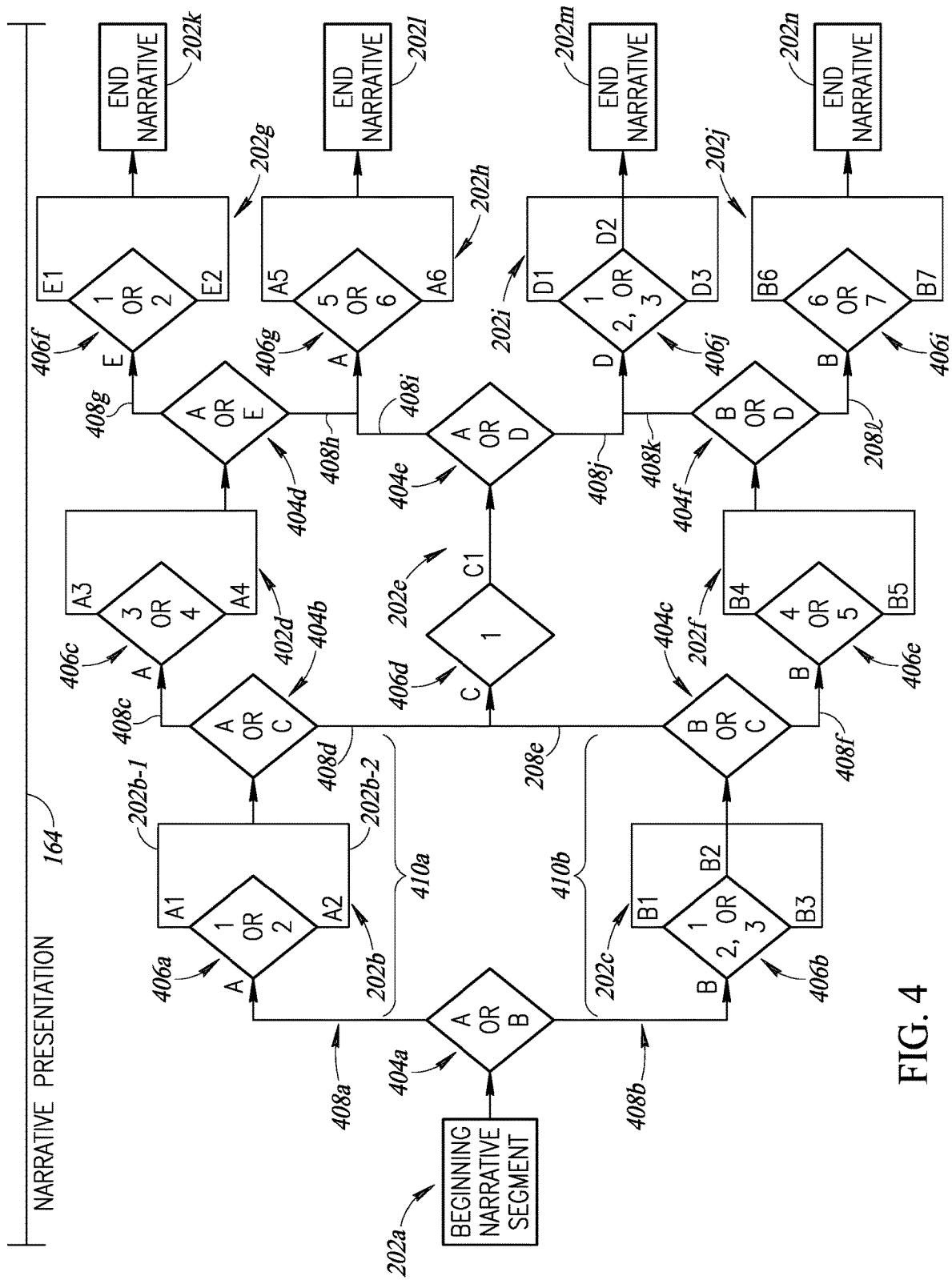
FIG. 4 is flow diagram of a narrative presentation with a number of narrative prompts, points (e.g., segment decision points), and narrative segments, according to at least one illustrated implementation.

The content consumer 130 may determine which narrative segments 202 of the narrative presentation 164 to view such that the narrative presentation 164 is not always the same. FIG. 4 shows a method 400 of a production in the form of a narrative presentation 164 comprised of a number of the narrative segments 202*a*-202*n* (collectively, "narrative segments 202"), a set of path direction prompts 404*a*-404*f* (collectively, "narrative prompts 404"), and a set of points 406*a*-406*i* (collectively, "points 406", e.g., path direction decision points), according to at least one illustrated implementation.

The narrative presentation 164 may be an interactive narrative presentation 164, in which the content consumer 130 selects or chooses, or at least influences, a path through the narrative presentation 164. In some implementations, input from the content consumer 130 may be received, the input representing an indication of the selection or decision by the content consumer 130 regarding the path direction to take for each or some of the points 406. The user selection or input may be in response to a presentation of one or more user interface elements that allow selection between two or more user selectable path direction options for a give point (e.g., path direction decision point).

Optionally, in some implementations, one or more of the content creator processor-based devices 112*a*-112*n*, the media content consumer processor-based devices 132*a*-132*n*, or other processor-based devices may autonomously generate a selection indicative of the path direction to take for each or some of the points 406 (e.g., path direction decision point). In such an implementation, the choice of path direction for each content consumer 130 may be made seamlessly without interruption and, or with presentation of a path direction prompt 404 or other selection prompt. Optionally, in some implementations, the autonomously generated path direction selection may be based at least on information that represents one or more characteristics of the content consumer 130, instead of being based on an input by the content consumer 130 in response to a presentation of two or more user selectable path direction options.

The content consumer 130 may be presented with the narrative presentation 164 as a series of narrative segments 202. Narrative segment 202*a* represents the beginning or foundational narrative segment and narrative segments 202*k*-202*n* represent terminal narrative segments that are presented to the content consumer 130 to end the narrative presentation 164. Note that the events depicted in the terminal narrative segments 202*k*-202*n* may occur before, during, or after the events depicted within the foundational narrative segment 202*a*. By presenting the same beginning or foundational narrative segment 202*a*, each content consumer 130 may for example, be introduced to an overarching common story and plotline. Optionally, the narrative presentation 164 may have a single terminal or ending narrative segment 202 (e.g., finale, season finale, narrative finale). In some implementations, each narrative segment 202 may be made available to every content consumer 130 accessing the narrative presentation 164 and presented to every content consumer 130 who elects to view such. In some implementations, at least some of the narrative segments 202 may be restricted such as to be presented to only a subset of media content consumers 130. For example, some of the narrative segments 202 may be accessible only by media content consumers 130 who purchase a premium presentation option, by media content consumers 130 who earned access to limited distribution content, for instance via social media sharing actions, or by media content consumers 130 who live in certain geographic locations.

User interface elements, denominated herein as path direction prompts 404, may be incorporated into various points along the narrative presentation 164 at which one path direction among multiple path directions may be chosen in order to proceed through the narrative presentation 164. Path directions are also referred to interchangeably herein as path segments, and represent directions or sub-paths within an overall narrative path. For the most part, path directions selected by the content consumer are logically associated (i.e., relationship defined in a data structure stored in processor-readable memory or storage) with a respective set of narrative segments.

In operation, the system causes presentation of user interface elements or path direction prompts 404. The system receives user input or selections made via the user interface elements or path direction prompts 404. Each user input or selection identifies a media content consumer selected path to take at a corresponding point in the narrative presentation 164.

In one mode of operation, the media content consumer selected path corresponds to or otherwise identifies a specific narrative segment. In this mode of operation, the system causes presentation of the corresponding specific narrative segment in response to selection by the media content consumer of the media content consumer selected path. Optionally in this mode of operation, the system may make a selection of a path direction if the media content consumer does not select a path or provide input within a specified period of time.

In another mode of operation, the media content consumer selected path corresponds to or otherwise identifies a set of two or more narrative segments, which narrative segments in the set are alternative "takes" to one another. For example, each of the narrative segments may have the same story arc, only may only differ in some way that is insubstantial to the story, for instance including a different make and model of vehicle in each of the narrative segments of the set of narrative segments. Additionally or alternatively each narrative segment in the set of narrative segments may include a different drink or beverage. In this mode of operation, for each set of narrative segments, the system can autonomously select a particular narrative segment from the set of two or more narrative segments, based on collected information. The system causes presentation of the corresponding particular narrative segment in response to the autonomous selection from the set, where the set is based on the media content consumer selected path identified by the selection by the media content consumer via the user interface element(s). Optionally in this mode of operation, the system may make a selection of a path direction if the media content consumer does not select a path or provide input within a specified period of time.

For example, at a first point (e.g., first decision point), indicated by the first path direction prompt 404*a*, a selection or decision may be made between path direction A 408*a* or path direction B 408*b*. Path direction A 408*a* may, for example, be associated with a one set of narrative segments 202*b*, and path direction B 408*b* may, for example, be associated with another set of narrative segments 202*c*. The narrative path portion associated with path direction A 408*a* may have a path length 410*a* that extends for the duration of the narrative segment presented from the set of narrative segments 202*b*. The narrative path portion associated with path direction B 408*b* may have a path length of 410*b* that extends for the duration of the narrative segment presented from the set of narrative segments 202*c*. The path length 410*a* may or may not be equal to the path length 410*b*. In some implementations, at least some of the narrative segments 202 subsequent to the beginning or foundational narrative segment 202*a* represent segments selectable by the content consumer 130 at the appropriate narrative prompt 404. It is the particular sequence of narrative segments 202 selected by the content consumer 130 that determines the details and sub-plots (within the context of the overall story and plotline of the narrative presentation 164) experienced or perceived by the particular content consumer 130. The various path directions 408 may be based upon, for example, various characters appearing in the preceding narrative segment 202, different settings or locations, different time frames, or different actions that a character may take at the conclusion of the preceding narrative segment 202.

As previously noted, each media content consumer selected path can correspond to a specific narrative segment, or may correspond to a set of two or more narrative segments, which are alternative (e.g., alternative "takes") to one another. As previously noted, for each set of narrative segments that correspond to a selected narrative path direction, the system can select a particular narrative segment from the corresponding set of narrative segments, for instance based at least in part on collected information that represents attributes of the media content consumer.

In some implementations, the multiple path directions available at a path direction prompt 404 may be based on the characters present in the immediately preceding narrative segment 202. For example, the beginning or foundational narrative segment 202a may include two characters "CHAR A" and "CHAR B." At the conclusion of narrative segment 202a, the content consumer 130 is presented with the first path direction prompt 404a including icons representative of a subset of available path directions 408 that the content consumer 130 may choose to proceed through the narrative presentation 164. The subset of path directions 408 associated with the first path direction prompt 404a may, for example, include path direction A 408a that is logically associated (e.g., mapped in memory or storage media) to a set of narrative segments 202b associated with CHAR A and the path direction B 408b that is logically associated (e.g., mapped in memory or storage media) to a set of narrative segments 202c associated with CHAR B. The content consumer 130 may select an icon to continue the narrative presentation 164 via one of the available (i.e., valid) path directions 408. If the content consumer 130 selects the icon representative of the narrative path direction that is logically associated in memory with the set of narrative segments 202b associated with CHAR A at the first path direction prompt 404a, then one of the narrative segments 202 from the set of narrative segment 202b containing characters CHAR A and CHAR C is presented to the content consumer 130. At the conclusion of narrative segment 202b, the media content consumer is presented with a second path direction prompt 404b requiring the selection of an icon representative of either CHAR A or CHAR C to continue the narrative presentation 164 by following CHAR A in path direction 408c or CHAR C in path direction 408d. Valid paths as well as the sets of narrative segments associated with each valid path may, for example, be defined by the writer, director, and, or the editor of the narrative, limiting the freedom of the media content consumer in return for placing some structure on the overall narrative.

If instead, the content consumer 130 selects the icon representative of the narrative path direction that is logically associated in memory with the set of narrative segments 202c associated with CHAR B at the first path direction prompt 404a, then one of the narrative segments 202 from the set of narrative segment 202c containing characters CHAR B and CHAR C is presented to the content consumer 130. At the conclusion of narrative segment 202c, the content consumer 130 is presented with a third path direction prompt 404c requiring the selection of an icon representative of either CHAR B or CHAR C to continue the narrative presentation 164 by following CHAR B in path direction 408f or CHAR C in path direction 408e. In such an implementation, CHAR C interacts with both CHAR A during the set of narrative segment 202b and with CHAR B during the set of narrative segment 202c, which may occur, for example, when CHAR A, CHAR B, and CHAR C are at a party or other large social gathering. In such an implementation, the narrative segment 202e associated with CHAR C may have multiple entry points, one from the second narrative prompt 404b and one from the third narrative prompt 404c. In some implementations, such as that shown in connection with the fourth point 206d (e.g. segment decision point), at least some points 406 (e.g., path direction decision points) may have only one associated narrative segment 202. In such implementations, the point 206 (e.g., path direction decision points) will present the single associated narrative segment 202 to the content consumer 130.

Depending on the path directions 408 selected by the content consumer 130, not every content consumer 130 is necessarily presented the same number of narrative segments 202, the same narrative segments 202, or the same duration for the narrative presentation 164. A distinction may arise between the number of narrative segments 202 presented to the content consumer 130 and the duration of the narrative segments 202 presented to the content consumer 130. The overall duration of the narrative presentation 164 may vary depending upon the path directions 408 selected by the content consumer 130, as well as the number and/or length of each of the narrative segments 202 presented to the content consumer 130.

The path direction prompts 404 may allow the content consumer 130 to choose a path direction they wish to follow, for example specifying a particular character and/or scene or sub-plot to explore or follow. In some implementations, a decision regarding the path direction to follow may be made autonomously by one or more processor-enabled devices, e.g., the content editing systems processor-based devices 180 and/or the media content consumer processor-based devices 132, without a user input that represents the path direction selection or without a user input that that is responsive to a query regarding path direction.

In some instances, the path directions are logically associated with a respective narrative segment 202 or a sequence of narrative segments (i.e., two or more narrative segments that will be presented consecutively, e.g., in response to a single media content consumer selection).

In other instances the path directions are logically associated with a respective set of two or more alternative narrative segments 202 (i.e., a single segment of the set of two or more will be selected to be presented, e.g., in response to a single media content consumer selection and an autonomous selection from the corresponding set by the system). Each set of narrative segments may include two or more narrative segments 202 that preferably include the same characters, follow same story arc or portion thereof, and may even share identical dialog and character interactions, and narrative techniques. At least one of the narrative segments 202 from the set of narrative segments may be selected or chosen, either by the content consumer 130 and/or autonomously by a processor-enabled device, at a point 206. The narrative segments in a given set of narrative segments may differ from one in another in subtle ways. For example, each of the narrative segments in a given set of narrative segments may have different types of objects or different brands of objects appearing in the respective segment, for example in the background or even being handled by a character. For instance, a first narrative segment may include a first type of drink or a first brand of drink, or a first type of vehicle or first brand of vehicle, while a second narrative segment may include a second type of drink or a second brand of drink, or a second type of vehicle or second brand of vehicle, different than the first. Likewise, other narrative segments in a given set of narrative segments may include other types of drinks, brands of drinks, types of vehicles, and, or brands of vehicles.

The differences between narrative segments in a given set of narrative segments are not limited to drinks and vehicles, but instead can represent any type of object or product or even service. In some implementations, the commercial products in the two or more of the narrative segments in any set of the narrative segments may be the same as one another but reflect different features of the commercial product. For example, in a set of narrative segments involving a car, one of the narrative segments may emphasize the speed or performance of the car such as might appeal to content consumer 130 comprised of younger audience member, whereas another of the narrative segments may emphasize the safety features of the car, as might appeal to content consumer 130 comprised of a parent. In such an implementation, selecting the next narrative segment to present based on the appearance of one of the commercial products in the next narrative segment may be based at least in part on the retrieved collected information about the content consumer 130. This approach advantageously allows the narrative to be tailored to the particular media content consumer, while still allowing the media content consumer some choice in control over the narrative presentation, and allowing the writer, director, and, or the editor some control over the overall structure of the narrative. The narrative segments 202 included within each set of narrative segments associated with a given path direction and given point 206 (e.g., decision point) may be previously defined, for example, by the content creator (e.g., writer, director) 110 and/or the content editor 120. For a chosen path direction A 408*a*, for example, at the point 206*a* (e.g., path direction decision point), the system may choose a narrative segment from a previously defined set of narrative segments 202*b* logically associated with the particular path direction and the particular point (e.g., path direction decision point), based on an assessment of attributes that characterize the particular media content consumer. That set of narrative segments may, for example, include first narrative segment A1 202*b*-1 and second narrative segment A2 202*b*-2.

Each of the first narrative segment A1 202*b*-1 and the second narrative segment A2 202*b*-2 may belong to a set of narrative segments logically associated (i.e., relationship stored in memory or storage) with the chosen path direction A 408*a*. The two narratives segment A1 202*b*-1 and A2 202*b*-2 may present the same plotline, story arc, and characters to the content consumer 130, but may be used to customize the details with the narrative segment 202*b* for the particular content consumer 130 being presented with the narrative presentation 164. In such an implementation, for example, the props, settings, clothing, or other features may be modified between the narrative segment A1 202*b*-1 and the narrative segment A2 202*b*-2, and customized based upon the content consumer 130. Thus, for example, in the narrative segment A1 202*b*-1, CHAR A may drink a sports drink such as Gatorade®, whereas in the narrative segment A2 202*b*-2, CHAR A may drink a bottled water such as Dasani®. As such, the ability to customize the features of a narrative segment 202 may advantageously be used to target product placements of commercial products and/or other types of advertisements towards the media content consumers 130 being presented with the narrative presentation 164. As shown in FIG. 4, a point 206 (e.g., segment decision point) may represent a location in the narrative presentation 164 in which a narrative segment 202 from a previously defined set of a plurality of narrative segments 202 to be chosen or selected to be presented to the content consumer 130 (e.g., the second segment point 206*b* (e.g., decision point), which has a previously defined set of three narrative segments 202*c*).

In some implementations, the narrative prompts 404, for example presented at points (e.g., path direction decision points), may be user-actionable such that the content consumer 130 may choose the path direction, and hence the particular narrative segment, or the set of narrative segments 202 from which a particular narrative segment 202 will be selected to be presented. In at least some implementations, the system may autonomously select a path direction and/or a particular narrative segment 202 from a set of previously defined narrative segments 202 associated with a selected path direction without receiving any selection by the content consumer 130. In such an implementation, the system may select the particular narrative segment from the set of narrative segments (i.e., set of alternative narrative segments), the set of narrative segments associated with the selected path direction or path direction decision point, based upon information related to the content consumer 130. Such information may include, for example, demographic information about the content consumer 130, previous browsing history by the content consumer 130, previous viewing history of the content consumer 130 related to the current and/or past narrative presentations 164 presented to the content consumer 130, and any other collected information related to the content consumer 130. As such, the selection of the narrative segment 202 to present to the content consumer 130 at a point 206 (e.g., segment decision point) may occur automatically from the perspective of the content consumer 130 such that the selected narrative segment 202 may be incorporated seamlessly into the narrative presentation 164.

In at least some implementations, while each content consumer 130 may receive the same overall storyline in the narrative presentation 164, because media content consumers 130 may select different respective path directions or narrative segment "paths" though the narrative presentation 164, different media content consumers 130 may have different impressions, feelings, emotions, and experiences, at the conclusion of the narrative presentation 164.

As depicted in FIG. 4, not every narrative segment 202 need include or conclude with a user interface element or narrative prompt 404 containing a plurality of icons, each of which corresponds to a respective media content consumer-selectable narrative segment 202. For example, if the content consumer 130 selects CHAR A at the fourth narrative prompt 404*d*, the content consumer 130 is presented a narrative segment from the set of narrative segments 202*h* followed by the terminal narrative segment 202*l*.

Figure 5A:
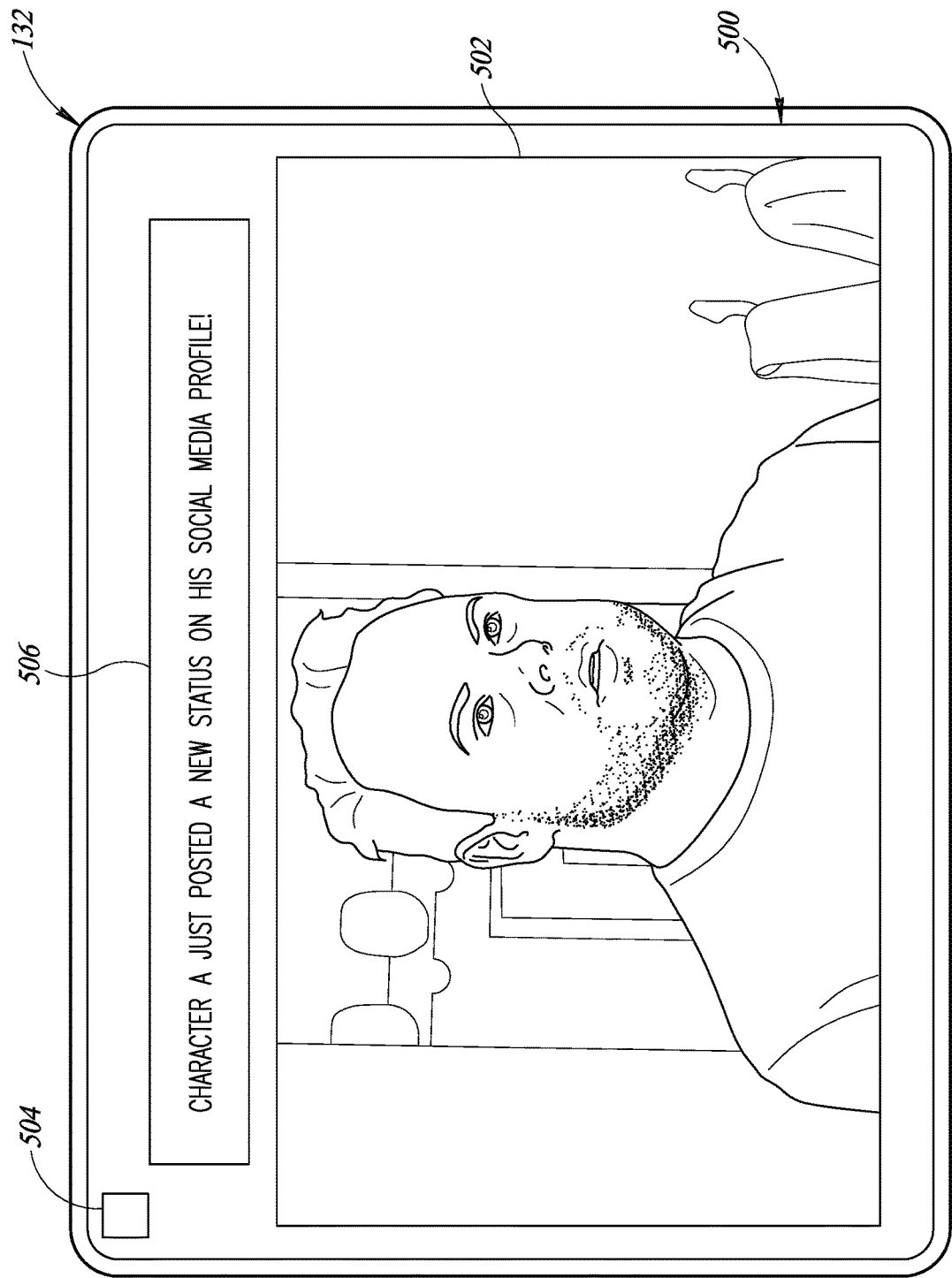
FIG. 5A shows a user interface presenting a narrative presentation on a content consumer device, according to at least one illustrated implementation.

FIG. 5A shows a first view of a user interface 500 for presenting the narrative presentation 164, social media instances 118, and faux Webpages 122 on the content consumer device 130, according to one or more implementations.

The user interface 500 is part of an application encoded in and accessible by executing the set of instructions 134 stored on the content consumer device 130. The user interface 500 is operable to access the narrative presentation 164, social media instances 118, and faux Webpages 122 to which the content consumer 130 has been granted access. The first view of the user interface 500 includes a media playback section 502 in which the narrative presentation 164 may be displayed. The media playback section 502 is an implementation of the presentation application 136 instructions of the set of instructions 134 described herein. The content consumer 130 may control various operations associated with the narrative presentation 164 via the input devices of the content consumer device 132, such as touchscreen controls, control devices (e.g., mouse, keyboard), and/or hardware control features integrated with the body of the content consumer device 132. The content consumer 130 may control which narrative presentation 164 is presented, or which narrative segment 202 is presented through interaction with a user interface menu 504 accessible in the user interface 500. In some implementations, the sequence and selection of narrative segments 202 presented is fixed; however, in other implementations, the sequence and selection of narrative segments 202 may be variable, and depend on actions by the content consumer 130 and/or information associated with the content consumer 130.

As the narrative presentation 164 is presented on the content consumer device 132, the set of instructions 134 causes the content consumer device 132 to track the playback progress of the narrative presentation 164. The content consumer device 132 may track playback progress based on an identifier of the narrative segment 202 currently being played and/or a current point in time of playback of the narrative presentation 164 or the current narrative segment 202. As a result of reaching defined playback progress points in the narrative presentation 164, the content consumer 130 may be provided with access to one or more social media instances 118. The content consumer 130 may be presented with a notification 506 in the user interface 500 regarding the newly available one or more social media instances 118. The content consumer 130 may access the one or more social media instances 118 available, for example, by navigating to a social media section 508 of the user interface via the menu 504, or by selecting the notification 506. The social media instances made available may represent social media postings or sharing purportedly made by a character in the narrative presentation, which may for instance be integral to the storyline of the narrative presentation. For example, the narrative presentation may at some point in the storyline describe a character in the narrative as sending a "Tweet", posting to a page or wall of a social network, posting a photo to a photo sharing site and, or posting an audio-visual file to a sharing site. If a particular content consumer has progressed through the narrative presentation to that point in the storyline, then the system makes the posting or sharing attributed to that character available to that particular content consumer, independent of a real world date and time. At the same date and time, the system may deny a different content consumer access to the posting or sharing attributed to that character available where that different content consumer has not made sufficient progress through the narrative presentation. Consequently, the social sharing of characters in a narrative presentation appear to evolve over time, customized to the progress of each respective content consumer through the narrative presentation. In this way, each content consumer has the impression that the character's social media postings and sharing are evolving in "real time" with respect to the unfolding of events in the narrative presentation, even though different content consumers are experiencing the unfolding of the events at very different real world dates and times.

Figure 5B:
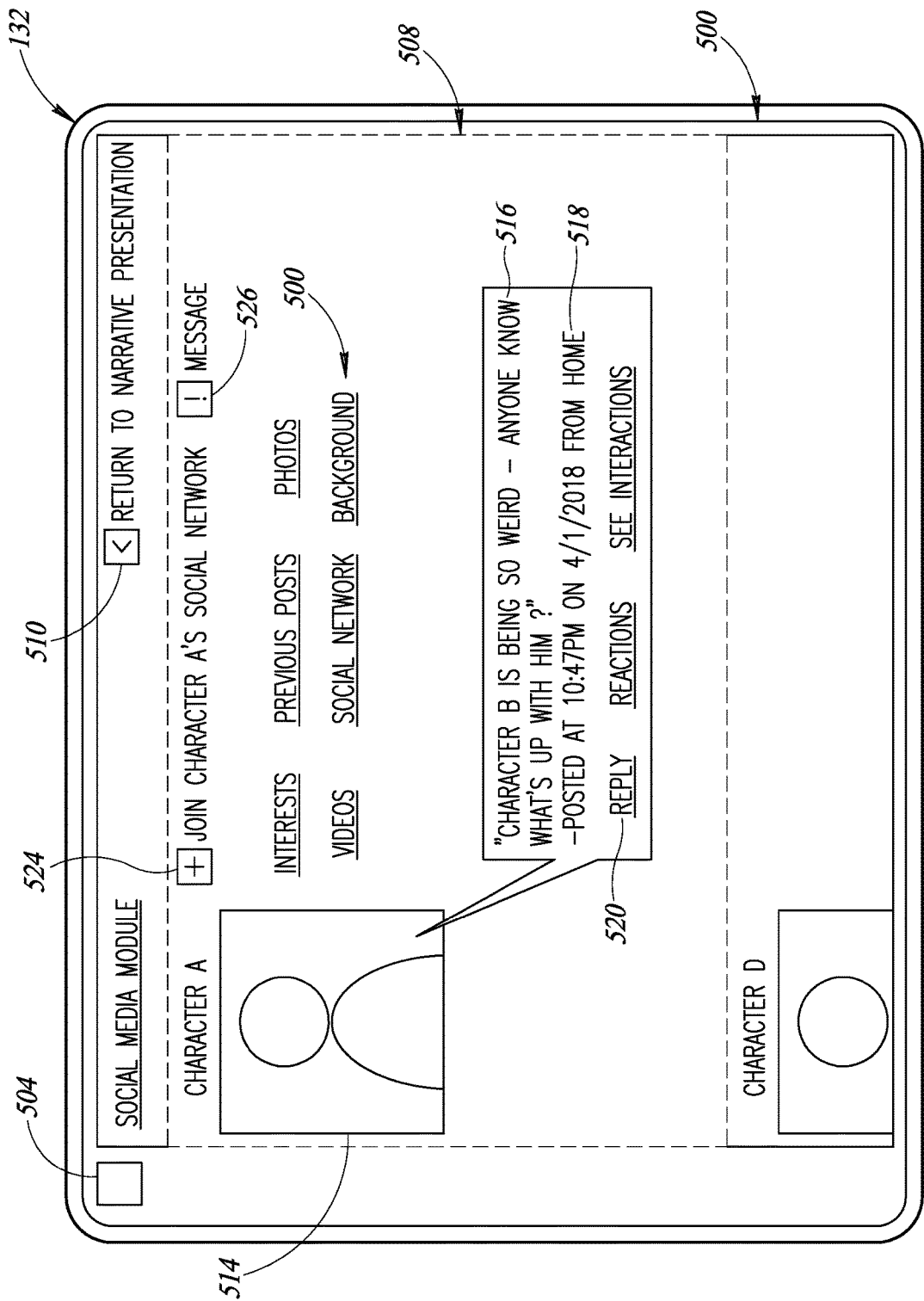
FIG. 5B shows the user interface presenting social media content on the content consumer device, according to at least one illustrated implementation.

FIG. 5B illustrates a second view of the user interface 500 presenting the social media section 508 wherein the content consumer 130 may experience and interact with social media instances 118 to which the content consumer 130 has been granted access. The social media section 508 is an implementation of the social media module 138 instructions of the set of instructions 134 described herein. Social media content in the social media section 508 may include characters in or related to the narrative presentation 164; images; audio-visual segments or files; background information about characters, places, and things in or related to the narrative presentation 164; and social media posts; by way of non-limiting example. The social media section 508 replicate the user experience (e.g., look, feel) of accessing a real-world social media site, but without the risk of spoiling details regarding the narrative presentation 164 or encountering potentially harmful or offensive material. The social media section 508 depicted occupies most of the display of the content consumer device 132; however, in some instances, the social media section 508 may be displayed simultaneously with the media playback section 502. For instance, the social media section 508 may be displayed side-by-side with the media playback section 502, or one of the social media section 508 and the media playback section 502 may be overlaid on top of the other within the display of the content consumer device 132.

The social media instances 118 help to immerse the content consumer 130 in the narrative presentation 164 by providing information regarding character's inner thoughts or actions or background information to the narrative presentation 164. The content of the social media instances 118 made available to a content consumer 130 as a result of reaching a certain progress point in the narrative presentation 164 may relate to the content of the narrative presentation contemporaneous to the progress point. Specifically, a social media instance 118 may be made available having content that relates to the content of a narrative segment 202 that the content consumer 130 is watching. The social media instance 118 may, for example, include a comment posted by one of the characters in the movie regarding an event, scene, or other character in a current narrative segment 202. In some instances, the character posting the social media instance 202 may be seen in the narrative segment 202 operating a processor-based device (e.g., smartphone, tablet computer) contemporaneously to a social media instance 118 becoming available.

A shortcoming of narrative presentations 164 in a some media formats (e.g., movies, television shows) is that it is difficult to present such internal thoughts, off-screen content or background information without disrupting the quality or the flow of the narrative presentation 164. For example, many recent movies have attempted to replicate social media sharing by characters by visually representing (animating) on the screen a text message box or tweet with corresponding content. Such can be highly distracting from the rest of the image, and fails to accurately capture the typically user interface interaction of social media, well-known by content consumers. By contrast, providing a social media section 508 for the content consumer 130 to access in an on-demand manner allows storytellers to weave detail into the narrative presentation 164 without adversely impacting its quality or flow, and while providing a more authenticate user experience from the user interface perspective. The social media section 508 may include a return feature 510 that, as a result of interaction with by the content consumer 130 (e.g., pushed, swiped), causes the user interface 500 to return to the media playback section 502 at the point in time in the narrative presentation 164 at which the content consumer 130 navigated away from the narrative presentation 164.

An example social media instance 512 in the social media section 508 is depicted in FIG. 5B. The social media instance 512 includes a set of the social media content 115 hosted by the static social media site 116. The set of social media content of the social media instance 512 comprises character content 514 of the name and/or a representative image of the character associated with the instance 512 and instance content 516 of information relevant to the narrative presentation 164 posted by the character. The relevant information of the instance content 516 may include commentary, observations, photographs, images, text, video, images, links, event, location, etc., that provide details enhancing, supplementing, or otherwise modifying details regarding the narrative presentation 164. The instance content 516 may include context information 518 indicating the time, date, or place at which the instance content 516 was purportedly generated with respect to a timeframe of the narrative presentation. Interaction content 520 may also be provided in association with the instance content 516 that the content consumer 130 may interact with to reply or provide a reaction to the instance content 516, or to view other character's comments or reactions to the instance content 516. Supplemental information 522 may be available for viewing or interacting with by the content consumer 130 to obtain a fuller portrayal of the character or immersion in the narrative, essentially breaking down the "fourth wall" between the content consumer and the characters. Such supplemental information 522 may include information regarding interests of the character, previous social media posts of the character, faux "real time" social media posts (i.e. social media posts that appear to occur within the time frame of the content consumer's own progress through the narrative presentation), photos and videos posted by the character, the character's social network (e.g., friends, family, coworkers), and background information regarding the character (e.g., age, hometown, occupation). The social media instance 512 may include features for connecting or interacting with the character, such as a button 524 for joining the character's social network, or a message button 526 for sending a private message to the character.

The social media section 508 may include content different than characters in at least some instances. For example, the social media section 508 may include social media pages or instances regarding places, such as towns, buildings, businesses, etc. relevant to the narrative presentation 164, or social media pages or instances regarding events, such as concerts, social gatherings, ceremonies, sporting events, festivals, etc., relevant to the narrative presentation 164.

The social media site 116 in at least some implementations is static such that the collective social media content available to all content consumers 130 is limited based on their respective progress through the narrative presentation. Additionally, a static social media site 116 may limit a collective of social media instances available for the content consumers 130 to experience or interact to social media content created or approved by the narrative presentation creators (e.g., writers, directors, editors of the narrative presentation in which characters are represented as posting or sharing social media instance). In a static social media site, social media content created by content consumers 130 themselves is preferably inaccessible for viewing or interaction with by other content consumers 130, unless approved by the narrative presentation creators or other authorized entities. Although content consumers 130 may create their own social media profile on the social media site 116, the content consumer 130 profiles may be inaccessible by other content consumers 130, unless approved by an authorized entity. At least some interactions with social media instances 118 by the content consumers 130 may be unavailable for viewing or interacting with by other content consumers 130. The static social media site 116 helps to prevent or restrict content consumers 130 from being exposed to inappropriate or potentially harmful interactions with other content consumers 130, and helps to prevent or restrict aspects of the narrative presentation 164 from being spoiled by other content consumers 130.

The content consumer 130 may create and modify their own social media profile that is associated with their user name or account in the environment 100. The content consumer 130 may include information about themselves (e.g., personal background information, demographic information, pictures) that may be used or included in the narrative presentation 164 or the supplemental content to enhance the content consumer's 130 experience. For instance, the audio-visual media content system 150 or the supplemental content system 170 may include pictures of the content consumer 130 in the narrative presentation 164, Webpages 122, or social media instances 118 to give the content consumer 130 the sense that they are part of the (fictional) world of the narrative presentation 164. Aspects of the narrative presentation 164 or the supplemental content may be modified or presented based on information about the content consumer 130. For instance, the content or format of a social media instance 118 may be modified based on a determination that such modifications are preferable to other content consumers having the same or similar demographic information to the content consumer 130. Such a determination may be based on statistical information generated based on content consumer reaction to content or format.

In some implementations, the content consumer 130 may be provided with interactive aspects of the set of instructions 134. The user interface 500 may provide the content consumer 130 with an option or section to interact with content in the system. In one aspect, the user interface 500 may include features allowing the content consumer 130 to interact artistically by drawing, coloring, or modifying images. The audio-visual media content system 150 and/or the supplemental content system 170 may then modify scenes of the narrative presentation 164 or social media instances 118, for example, by incorporating the artistic interactions therein. The user interface 500 may facilitate other interactions, such as messaging characters in the narrative or uploading pictures, which may be incorporated into the narrative presentation 164 or the supplemental content. This draws the content consumer 130 into the social web with a navigational framework that mirrors experiences and expectations with media outside of the environment 100.

Figure 5C:
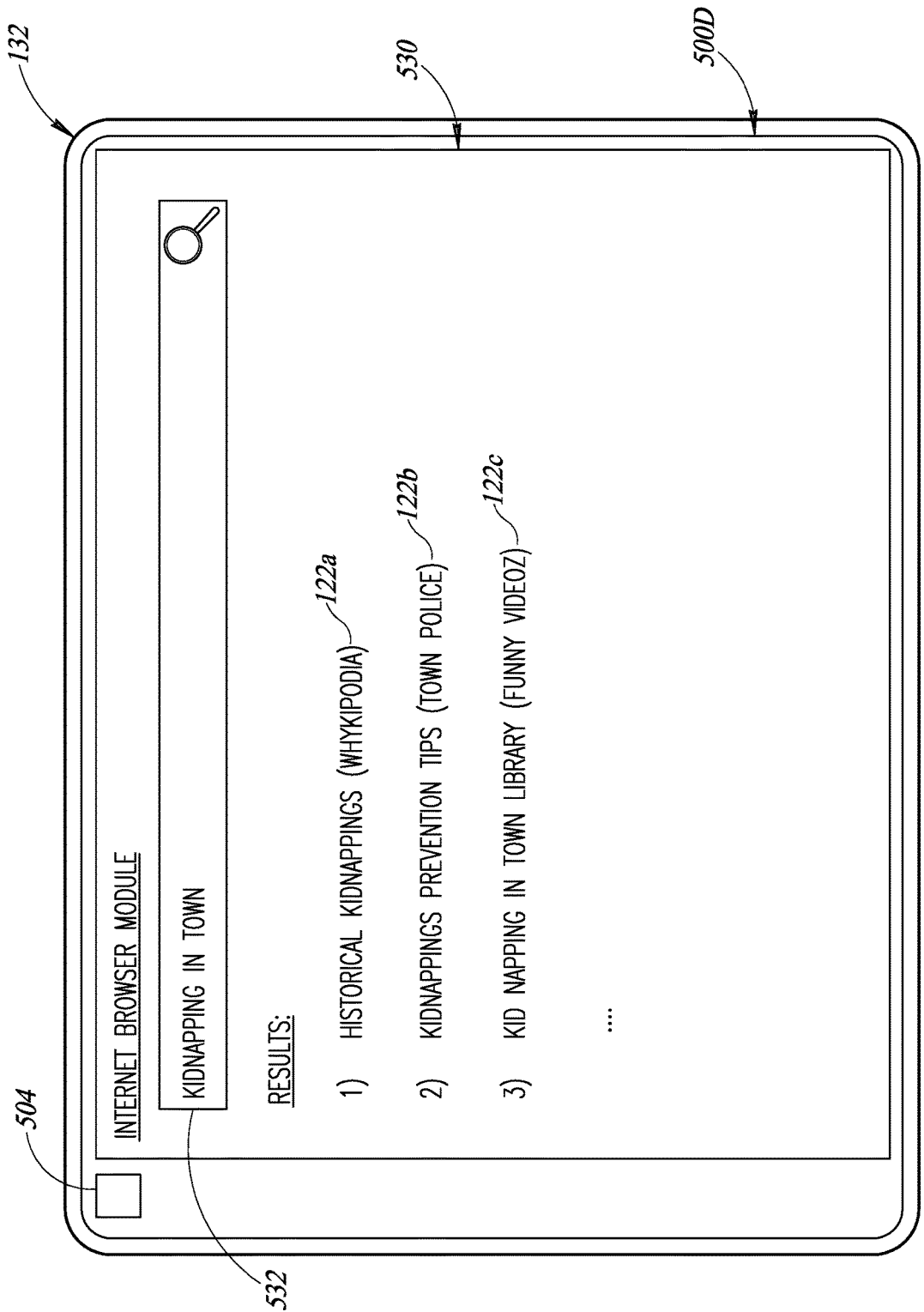
FIG. 5C shows the user interface presenting faux Web content at a first time on a content consumer device, according to at least one illustrated implementation.

FIG. 5C shows a third view of the user interface 500C presenting faux Web content to the content consumer 130 at a first point in time. The user interface 500C includes a browser section 530 by which the content consumer 130 may access a collection of the faux Websites 119. The browser section 530 includes a navigation tool 532 which the content consumer 130 may interact with to navigate to the collection of static faux Websites 119 or portions thereof. For instance, the content consumer 130 may enter a (fictitious) Website address into the navigation tool 532 or enter terms or phrases to search for among the collection of faux Websites 119. The browser section 530 operates in a manner similar to some conventional Internet browsers (e.g., Mozilla Firefox®, Google Chrome®) except that the browser section 530 may only access the collection of static faux Websites 119. The browser section 530 is an implementation of the browser module 139 instructions of the set of instructions 134 described herein.

The browser section 530 at the first time is shown as displaying links to a set of faux Webpages 122. The set of faux Webpages 122 is provided to the content consumer 130 as a result of submitting a search request in the navigation tool 532. For example, a content consumer 130 may, at the first time, conduct a search using the navigation tool 532 for the phrase "kidnapping in Town," which may be related to the content in a first narrative segment in the narrative presentation 164 to which the content consumer 130 has progressed. In response, the browser section 530 may obtain, from the set of faux Webpages 122 available for access to the content consumer 130, a subset of the faux Webpages 122 available that include or are related to the searched phrase. In this case, the browser section 532 is displaying a set of faux Webpages 122a through 122c related to the search. The content consumer 130 may access the faux Webpages 122 in a conventional manner by selecting the links thereto.

The browser section 530 or its components (e.g., navigation tool 532) may also be included in or accessible via other parts of the user interface 500. For instance, the navigation tool 532 may be accessed from within the media playback section 502 or the social media section 508 via a shortcut or widget therein. In some implementations, different sections may be displayed or accessible simultaneously within the user interface 500, for example, by presentation of two or more sections in a side-by-side manner or having one section overlaid within another section.

The faux Webpages 122 accessible by the browser section 530 may change as a result of progressing to particular progress points in the narrative presentation 164, or accessing particular social media instances 118 or faux Webpages 122.

Figure 5D:
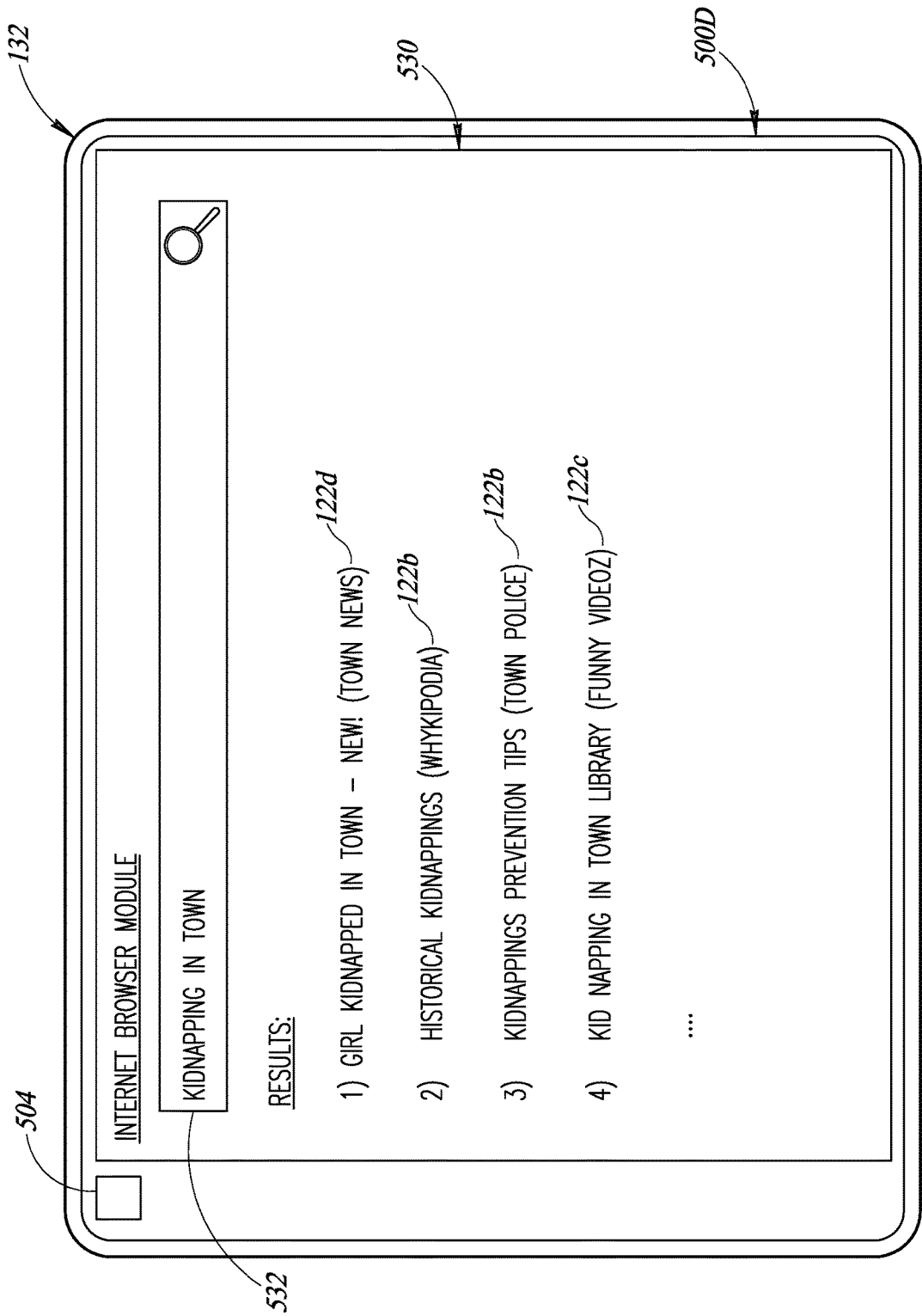
FIG. 5D shows the user interface presenting faux Web content at a second time on the content consumer device, according to at least one illustrated implementation.

FIG. 5D shows a fourth view of the user interface 500D presenting faux Web content to the content consumer 130 at a second point in time after the first point in time discussed with respect to FIG. 5C. In the browser section 530 of the user interface 500D at the second point in time, the content consumer 130 has conducted a search through the available faux Websites 119 and available faux Webpages 122 using the navigation tool 532 identical to the search performed at the first point in time shown in FIG. 5C. However, as a result of changes to the access privileges of the content consumer 130 after the first point in time, the browser section 530 provides access to a faux Webpage 122d that was unavailable to the content consumer at the first point in time. In particular, the browser section 530 is displaying a link to a faux Webpage 122d that was not provided in the search results at the first point in time, and which the content consumer 130 did not have access privileges to at the first point in time.

The access privileges of the content consumer 130 may be different at the second point in time than the access privileges of the content consumer 130 at the first point in time due to progress in the narrative presentation 164 or interaction with supplemental content. For example, the access privileges of the content consumer 130 may be modified as a result of reaching a progress point further in the narrative presentation 164 than where the content consumer 130 was at the first point in time. As another example, the access privileges of the content consumer 130 may be modified as a result of the content consumer 130 interacting with or viewing social media instances 118 or faux Webpages 122 after the first point in time. By changing the content available to the content consumer 130 in this manner, the content consumer 130 is given a sense that the (fictional) world of the narrative presentation 164 is changing as a result of events in the narrative presentation 164 or even their own interactions with social media instances 118, thereby enhancing the immersive experience provided by the technology described herein.

The different sections of the user interface 500 (e.g., media playback section 502, social media section 508, browser section 530) are described as being parts a common user interface. In some implementations, parts of the sections of the user interface 500 may be accessible via shortcuts or widgets in other sections. In some implementations, one or more of the sections may be implemented as separate applications individually accessible in the operating system of the content consumer device 132 storing the set of instructions 134. Moreover, the set of instructions 134 may be broken into separate components (e.g., applications, widgets) without departing from the scope of the instant disclosure.

Figure 6:
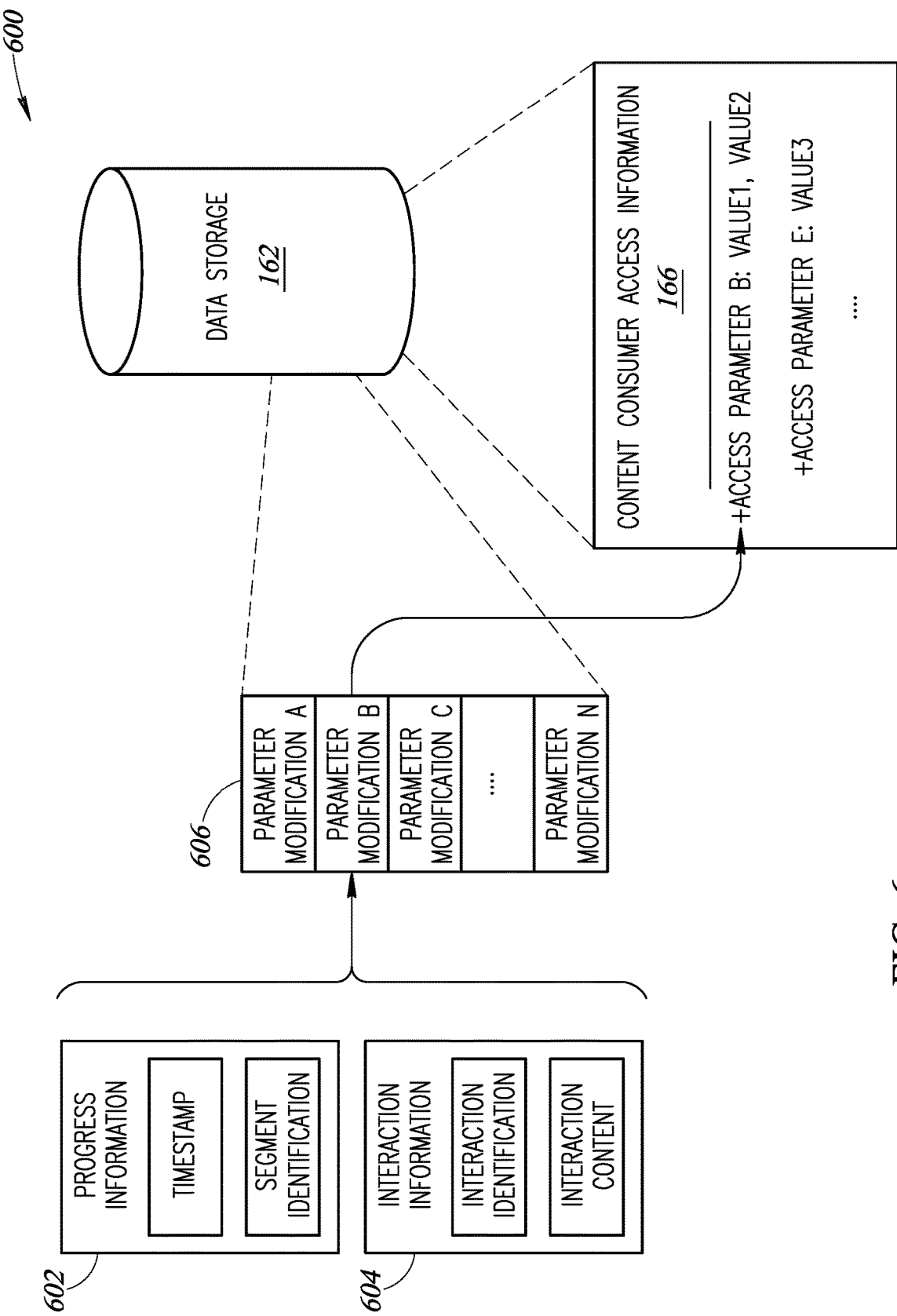
FIG. 6 shows a data structure comprising access parameters for providing a content consumer with access to various content, according to at least one illustrated implementation.

FIG. 6 shows a diagram 600 for modifying access information 166 of the content consumer 130, according to one or more implementations.

Access information 166 is associated in memory with a user account of each content consumer 130 and indicates content to which the content consumer 130 is granted or denied access. The access information 166 may comprise a set of access parameters 608 that are modified as a result of reaching progress points in the narrative presentation 164, or as a result of interacting with or viewing supplemental content. Values associated with the access parameters 608 may define particular content that is presented to the content consumer 130. For instance, a particular access parameter 608 may define whether the content consumer 130 can access a particular post or character profile whereas a value of the access parameter 608 may determine which replies to a particular post or which posts by a character the content consumer 130 should see. A system in the environment 100, such as the Web server 160, may modify the access information 166 based at least in part on playback progress with the narrative presentation 164 or interactions with the supplemental content.

The set of instructions 134 cause the content consumer device 132 to determine progress information 602 indicating the playback progress of the narrative presentation 164 on the content consumer device 132. The progress information 602 may be time information indicating a current point in time of playback of the narrative presentation 164 or segment identification information identifying the current narrative segment 202 being played or last completed. The of instructions 134 also cause the content consumer device 132 to determine interaction information 604 indicating interactions by the content consumer 130 with supplemental content. The interaction information 604 may comprise information identifying supplemental content that the content consumer 130 has viewed or interacted with (e.g., identifier of social media instance 118), or interaction information about the particular interactions with the supplemental content (e.g., interaction is a comment on a social media instance 118). The progress information 602 and/or the interaction information 604 are used to determine modifications, if any, to the access information 166.

An association in memory (e.g., data storage 162) may be stored between the progress information 602 or interaction information 604 obtained and one or more corresponding parameter modifications 606. The parameter modifications 606 may include an identifier of an access parameter to be modified and a value for the access parameter. The association in memory may be with a lookup table in which one or more corresponding parameters modifications 606 are associated with a location (e.g., row number, column number) of the progress information 602 or interaction information 604 in the table. As another example, the association may be a hash table, hash map, or other associative array in which the progress information 602 or interaction information 604 is mapped, using a hash function, to a location storing the one or more corresponding parameter modifications 606. The modifications 606 may include identifiers for the access parameter 608 to be modified, and a value for modifying the access parameter 608. The modifications 606 to the user account define content that the content consumer 130 is allowed to access and content to be presented to the content consumer 130. The content consumer 130 may access narrative segments 202, social media instances 118, or faux Webpages 122 for which the access parameters 608 included in their access information 166 are sufficient.

Modifying access parameters 608 in the user account of the content consumer 130 based on progress in the narrative presentation 164 or interactions with supplemental content allows the system to provide content without concern that the content consumer 130 will be prematurely exposed to narrative details. Whenever content is presented by the content consumer device 132 or provided by the Web server 160, the access parameters 608 in the user account of the content consumer 130 may be evaluated to determine what content the content consumer 130 has privileges to access. The content presented to the content consumer 130 may therefore vary according to their progress in the narrative presentation 164 and interactions with the supplemental content. Different content consumers 130 may therefore experience different content or experience content at different times. As an illustration, access parameters 608 of a user profile of a content consumer 130 who has viewed the narrative presentation 164 up to a second segment 202*b* may access the social media profile of a missing character and see that people have posted well-wishing comments. Later, after viewing the narrative presentation 164 up to a subsequent narrative segment 202*x* where it is revealed that the missing character perpetrated a hoax, the comments to the character's social media profile may demonstrate a sense of betrayal.

In some implementations, access to content may be determined in a more probabilistic manner. Instead of modifying the access information 166 in an absolute manner, the values of at least some of the access parameters 608 may be useable to calculate different variations in content discovery. The values may vary between 0.0-1.0, where in the values control the likelihood that content associated with the access parameter 608 will be presented or made available to the content consumer 130. For example, search in the navigation tool 532 for the term "kidnapping" could initially have a probability (value) of 0.0 of an access parameter 608 associated with a faux Webpage 122 revealing details of a kidnap story. Thereafter, as a result of the content consumer 130 observing a narrative segment 202 showing the kidnapping, the probability of the associated access parameter 608 may be boosted to 0.5, increasing the likelihood that the faux Webpage 122 will be returned for a similar search while giving the appearance that the faux Webpage 122 may not appear to all content consumers 130 at the same time or as a result of the same interactions.

As generally described herein, content consumers may be selectively provided access to certain content that, but for satisfaction of certain conditions, would not otherwise be made available. In some instances, the content to which access is conditional granted may be denominated as discoveries, the content viewer "discovering" the pieces of content in response to satisfaction of certain conditions and/or an occurrence one or more events. For example, the discoveries made available to any given content consumer may be dynamically updated, for instance based on an amount of progress the content consumer has made through the narrative presentation.

As one example, one of the discoveries may take the form of an interactive search function. A content consumer user may use an interactive search function, implemented by the system, to search for items, audio, visual or audiovisual segments, media, trivia and other information that are relevant to the storyline or premise of the narrative presentation. However, as the user progresses through the story, certain additional or different information is made available. For instance, if a content viewer progresses a first, limited amount into the narrative presentation, the an interactive search may retrieve a limited amount of "historical" information. If the content viewer progresses a second, further amount into the narrative presentation, the an interactive search may retrieve information that is more pertinent to the specific narrative presentation, including for example identifying a specific character involved with a premise or act presented in the narrative presentation. For instance, in a narrative involving a kidnapping, an interactive search performed after experiencing only the first few minutes of the narrative presentation may retrieve information related to historical kidnappings, prevention tips, etc. However, after experiencing a sufficient amount of the narrative presentation to realize that a kidnapping portrayed in the narrative presentation has occurred, use of the same search term with the interactive search function would retrieve stories or other information that feature a kidnapped protagonist. The a later search would thus retrieve information that has been customized based on the progress of the content viewer through the narrative presentation.

The interactive search functionality is just one example of dynamically updating available discoveries or the content thereof, or providing access to additional content based on actual progress a content consumer has made through a narrative presentation. For instance, faux social media pages can be generated, with the content updated based on relative progress a content consumer has made through the narrative presentation. For example: initially the protagonist's faux social media Web page can have friend's posts about trivial, high school stuff. Once the content consumer has reached a point in the narrative presentation where the protagonist has been kidnapped, new posts are added to the protagonist's faux social media Web page (e.g., "I hope you're found safe!" "thoughts and prayers", etc.). Once the content consumer has reached a point in the narrative presentation where they discover that the kidnapping was a hoax, new posts could be added to the protagonist's faux social media Web page (e.g., showing a sense of betrayal).

Supplemental information may be dynamically altered relative to main content that has been experienced by a given content consumer. There are a number of approaches to technically implement this functional any one or more which can be employed alone or in combination.

One approach includes mapping discoveries or additional content or updated content to respective specific instances of time in the narrative presentation. The system may produce an alert or message each time a content consumer reaches certain portions in the narrative presentation. The alert or message may, or may not, include an identifier that identifies which portion of the narrative presentation the alert or message is associated. The system can use the mapping to trigger an action based on the occurrence of the alerts or messages. For example, on reaching a defined point in the presentation of the narrative presentation, a processor-based device (e.g., content viewer device) produces an alert or message. The mapping can be used to trigger an action, for example, adding or revising one or more parameters of a content consumer profile logically associated with the particular the content consumer experiencing the narrative presentation. A processor-based device (e.g., backend server or narrative content server) may employ the content consumer's profile to accurately determine that the user has been exposed to certain portions of the narrative presentation. When one or more discoveries or additional content or updated content are to be loaded or otherwise made available to the content consumer, the information stored in the content consumer's profile can be accessed, and the content of the discoveries or additional content or updated content selected, adjusted or changed based on the information available in the respective content's consumer's profile. That way, even if two different content consumers are experiencing respective instances of the same narrative presentation, the two content consumers will have not have access to the same set of additional content or information available in their respective discoveries until they have each reached the same point in the narrative presentation.

Another approach is more probabilistic. A content consumer profile is populated with all of the parameters that will be used to calculate the different variations in the discoveries or additional content or updated content before the content consumer progresses into the narrative presentation. These parameters are probabilistic in nature and range in value from for example 0.0-1.0. The parameters control a likelihood of a given piece of information or content will readily appear. For example, the term "kidnapping" entered into an interactive search could initially have a probability of 0.0 of revealing a character's kidnap story. Yet, when the kidnapping is observed by the content consumer in the narrative presentation, that probability can be boosted to 0.5 (or something similar), increasing the likelihood of a particular story or content or details to appear while searching, but giving the illusion that it may not appear in the same place to all users (or at all).

In at least some aspects, the system may implement a dynamic social interface—In particular, the system can dynamically adapt and customize a visual interface based at least in part on information representative of a user or content consumer and/or based on display content created by the user or content consumer within an application (e.g., a narrative viewer application via which the narrative is presented).

For example, a processor-based device (e.g., content viewer device) may employ specific user information to make social networking components of the application (e.g., a narrative viewer application via which the narrative is presented) feel more realistic and visceral. The processor-based device may dynamically change a user interface or portion thereof, for example based on contented user permissions. For instance, a user or content consumer may discover their avatar(s) and/or username(s) on faux social media pages the user or content consumer scrolls through various discoveries. Additionally or alternative, a user or content consumer may be included on an email thread, or tagged in a post involving students in a school. These subtle changes help recast a role of the content consumer viewer's role, and grant the user or content consumer a sense of agency in the narrative (e.g., story). Thus, instead of playing voyeur, a user or content consumer feel like an active participant in the narrative. Users or content consumers are thus drawn into the social web with a navigational framework that closely mirrors their experiences and expectations with media outside of the narrative presentation.

In some implementations, the processor-based device may provide the user or content consumer with an opportunity to draw pictures, create art, or record video, for instance at defined points during the narrative presentation. The processor-based device can use these creations to make the user interface feel unique to the particular user or content consumer. For instance, if a user or content consumer colors a butterfly, the processor-based device may later animate the drawing to fly across a homepage.

Additionally or alternatively, information about a specific user or content consumer can be used to curate a narrative presentation.

For example, a processor-based device may use personal information that is representative or characterizes a given user or content consumer to determine which aspects of a narrative presentation can be altered to create a more personalized story, and/or to alter the narrative presentation accordingly. Such is not necessarily avatar-like customization, but rather may significantly affect the overall narrative structure.

Case in point, let's say that for On This Day, we have a storyline that deals with adversity by other children. If we know that a child is, say, of a specific socioeconomic status, we can alter either the environment of the main characters in On This Day to reflect the surroundings of the user, or we can adjust the storylines to better scenarios the user is likely to encounter.

Such can be explained with an example. Assume that the user or content consumer is lower-middle class, goes to a public school in the Midwest. The processor-based device may select a narrative presentation or portions thereof with a storyline that deals with adversity that is more relevant, like having to deal with a bully who comes from a family struggling to get by after the breadwinner of the family is laid off. Alternatively, assume that the user or content consumer is upper middle-class and raised in the Caribbean. The processor-based device can select a narrative presentation or portions thereof accordingly for instance to demonstrate how a bully in swimming class is dealt with in the middle of the holiday season. The customization can be to complete story lines or portions thereof, all based on a knowledge of a user's or content consumer's personal characteristics or information, or even preferences.

Figure 7:
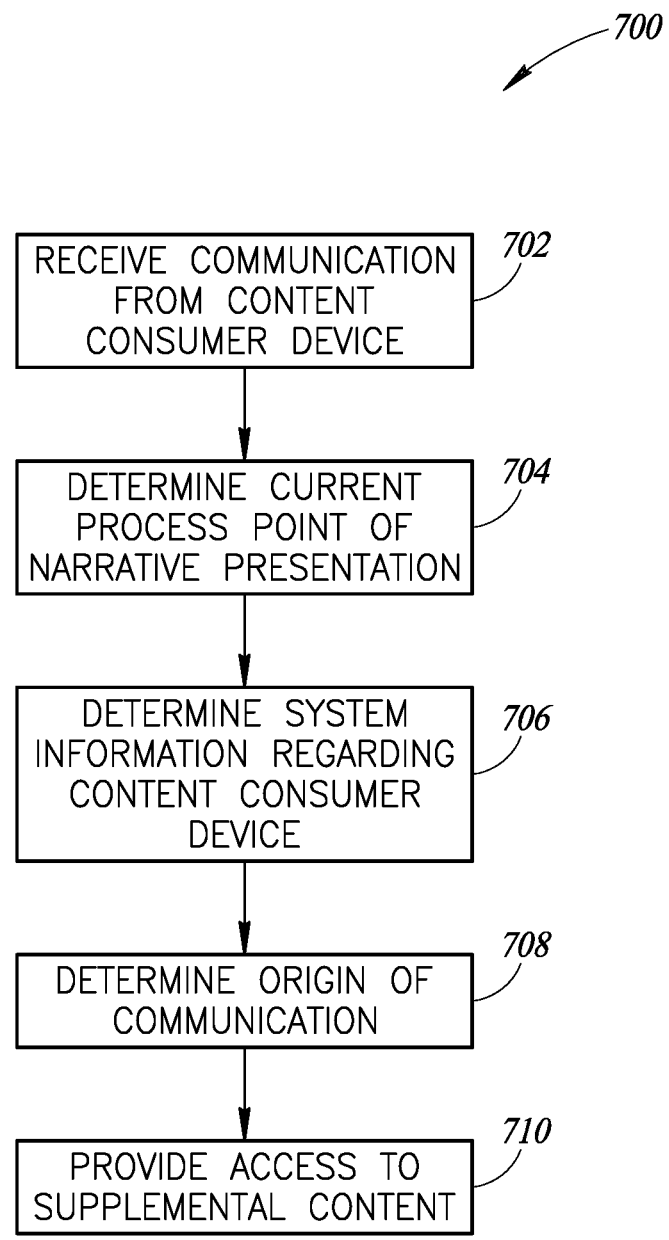
FIG. 7 shows a flow diagram for providing access to a content consumer, according to at least one illustrated implementation.

FIG. 7 shows a method 700 in which access to supplemental content, such as social media instances 118 or faux Webpages 122, is provided, according to at least one illustrated implementation.

The method 700 is performed by the Web server 160 or other appropriate system in network communication with the content consumer device 132. At various points during the method 700, the Web server 160 may be providing (e.g., streaming) media content 113 to the content consumer device 132 executing the set of instructions 134. The set of instructions 134 executing cause the content consumer device 132 to present the narrative presentation 164 on one or more output devices thereof.

The method 700 begins at 702 by receiving a communication from the content consumer device 132 over the network 140. The communication contains a set of information that includes one or more of a request for supplemental content, a request for audio-visual media content, identification information of the content consumer 130 associated with the content consumer device 132, progress information 602, and interaction information 604.

At 704, the Web server 160 determines a current point of the content consumer 130 in experiencing the narrative presentation 164. In some instances, the current point may indicate a playback point of the content consumer 130 in experiencing the narrative presentation 164, such as an elapsed time of playback of the narrative presentation 164 relative to the beginning. In some instances, the current point may indicate a playback point of the content consumer 130 in experiencing a particular narrative segment 202, including identification information of the particular narrative segment 202.

The Web server 160 provides 710 the content consumer 130 with access to supplemental content based at least in part on the current point of progress determined in 704. A composition of the supplemental content to which the content consumer is provided access is based at least in part on the current point of progress of the content consumer 130. For example, the content consumer 130 may be provided with access to a particular social media instance 118 based on the current point of progress, the particular social media instance 118 comprises social media content 115 that represents content that would have been shared by a character in the narrative presentation 164 up to a point in the narrative that the content consumer 130 has progressed. In a corresponding portion of the narrative presentation 164 contemporaneous to the current point of progress, the character may be seen interacting with a smartphone or other processor-based device, suggesting that the character is posting to a social media site. The Web server 160 may provide access to a corresponding social media instance 118 based on that current progress point in the narrative presentation 164 or narrative segment 202. A notification may be issued on the content consumer device 132 in connection with the access provided in 710 indicating that the character recently posted a new social media instance. As a result of providing access to the corresponding social media content 115 (or other supplemental content), the corresponding social media content 15 may become available to the content consumer 130 via interacting with the user interface 500.

The method 700 may optionally include determining 706 system information regarding the content consumer device 132 that the content consumer 130 is experiencing the narrative presentation 164. The system information indicates at least the operating system being used by the content consumer device 132 to experience the narrative presentation 164. The system information may indicate other information regarding the content consumer device 132, such as the model of the content consumer device 132, hardware included in the content consumer device 132, or permissions granted to the set of instructions 134 on the content consumer device 132. How to provide 710 access to the supplemental content may be determined based on the system information determined in 706. For example, based on the system information, the Web server 160 may determine to provide 710 access to the supplemental content within the presentation application 136 or other module in the set of instructions 134. Based on the system information, the Web server 160 may determine to provide 710 access to the supplemental content with a selectable link presented in the presentation application 136 or other module of the set of instructions 134. Selection of the link may cause the content consumer device 132 to switch between the presentation application 136 to a different application, such as another module in the set of instructions 134 (e.g., social media module 138) or third-party application installed on the content consumer device 132 (e.g., Facebook®, Google Chrome®).

The method 700 may optionally include determining 708 an origin of the communication received in 702. In 708, the Web server 160 may determine which set of instructions generated the communication and provide 710 access to the supplemental content based at least in part on the set of instructions determined. In response determining that the communication was generated from within the presentation application 136 or other module of the set of instructions 134, the Web server 160 may provide the content consumer 130 with access to a supplemental content instance of the static social media site 116 or the static faux Website 119. Conversely, in response to determining that the communication was generated from outside of the presentation application 136 or other module of the set of instructions 134, the Web server 160 may provide the content consumer 130 with access to a dynamic social media site or dynamic website, such as by providing the content consumer 130 with a selectable link to the dynamic site.

The method 700 may be an iterative or repetitive process in which the Web server 160 receives a plurality of communications over a period of time and processes the communications to provide access. The Web server 160 may execute multiple instances of the method 700 in parallel or in series. For instance, after receiving a first communication in 702 at a first time, the Web server 160 may receive a second communication at a second time and determine a current point of a content consumer 130 in experiencing a narrative presentation 164. The second communication may be provided by the same content consumer 130 or a different content consumer 130. For each content consumer 130, the Web server 160 tracks progress of one or more narrative presentations 164 and provides access to supplemental content related to the one or more narrative presentations 164.

As an example, the Web server 160 may receive 702 a communication from a second content consumer 130 at a second time after the first time, determine 704 a current progress point of the second content consumer 130 in the narrative presentation 164, and provide 710 the second content consumer 130 with access to supplemental content based on the current point of progress of the second content consumer 130. The current point of progress of the second content consumer 130 may be the same as a progress point previously experienced by the first content consumer 130. However, the supplemental content to which the Web server 160 provides 710 access to may be the same as or different than the supplemental content provided to the first content consumer 130 in response to the same progress point based on one or more factors. Such factors may include supplemental content interacted with, narrative segments experienced, the origin of the communications, and system information of the content consumer devices 132 operated by the respective content consumers 130, by way of non-limiting example. As a result, different content consumers 130 may experience the narrative presentation 164 and associated supplemental content differently, while still being provided with an immersive multi-dimensional experience comprising different media types.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Pat. No. 9,544,040; U.S. patent application Ser. No. 14/209,582; U.S. patent application Ser. No. 15/329,891; U.S. patent application Ser. No. 15/543,482; U.S. patent application Ser. No. 16/141,668; U.S. patent application 62/637,056; U.S. patent application 62/740,161; U.S. patent application 62/671,890; and U.S. patent application 62/745,715, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of providing entertainment, the method comprising:
for a first content media consumer of a first narrative presentation,
at a first time,
determining a current point of the first content media consumer in experiencing a presentation of the first narrative presentation; and
providing the first content media consumer with access to a first instance of a first static social media site, the first instance of the first static social media site which includes a first set of social media content available to the first content media consumer during a first period of time, the first set of social media content comprising content that represents content that would have been shared by at least a first character in the first narrative presentation, a composition of the first set of social media content based at least in part on the determined current point of the first content media consumer in experiencing the presentation of the first narrative presentation, wherein providing the first content media consumer with access to a first instance of a first social media site comprises providing the first content media consumer with access to a first faux static social media site, the content available via the first faux static social media site being at least partially populated with content based on at least one characteristic or at least one attribute of the first media content consumer.

2. The method of claim 1, further comprising:
for the first content media consumer of the first narrative presentation,
at a second time,
determining a second current point of the first content media consumer in experiencing the presentation of the first narrative presentation; and
providing the first content media consumer with access to a second instance of the first social media site, the second instance of the first social media site which includes a second set of social media content available to the first content media consumer during a second period of time, the second set of social media content comprising content that represents content that would have been shared by at least the first character in the first narrative presentation, a composition of the second set of social media content based on the determined second current point of the first content media consumer in experiencing the presentation of the first narrative presentation, the composition of the second set of social media content different from the composition of the first set of social media content.

3. The method of claim 1 wherein the first narrative presentation is an interactive narrative presentation comprising a plurality of narrative segments selectable by the first content media consumer, and wherein determining the current point of the first content media consumer in experiencing a presentation of the first narrative presentation includes determining which of the plurality of narrative segments have been presented to the first content media consumer.

4. The method of claim 1 wherein the first narrative presentation is an interactive narrative presentation comprising a plurality of narrative segments selectable by the first content media consumer, and wherein determining the current point of the first content media consumer in experiencing a presentation of the first narrative presentation includes determining which of the plurality of narrative segments have been presented to the first content media consumer and an elapsed time into a presentation of a currently presented one of the narrative segments.

5. The method of claim 1, further comprising:
receiving a first request from the first content media consumer; and
determining whether the received first request was generated from within a presentation application via which the first narrative presentation is presented to the first media content consumer, wherein providing the first content media consumer with access to a first instance of a first static social media site is at least in part in response to a determination that the received first request was generated from within the presentation application.

6. The method of claim 5, further comprising:
receiving a second request from the first content media consumer;
determining whether the received second request was generated from within the presentation application via which the first narrative presentation is presented to the first media content consumer; and
providing the first content media consumer with access to a first dynamic social media site at least in part in response to a determination that the received second request was generated from outside the presentation application.

7. The method of claim 1 wherein providing the first content media consumer with access to a first instance of a first social media site that includes a first set of social media content available to the first content media consumer includes presenting the first instance of the first social media site within a presentation application via which the first narrative presentation is presented.

8. The method of claim 1 wherein providing the first content media consumer with access to a first instance of a first social media site that includes a first set of social media content available to the first content media consumer includes providing a selectable link within a presentation application via which the first narrative presentation is presented, selection of which causes a switching from the presentation application to a second application, the second application different from the presentation application.

9. The method of claim 8 wherein switching from the presentation application to a second application comprises switching from the presentation application to a Web browser application.

10. The method of claim 1, further comprising:
determining which of a number of operating systems (iOS/Android vs tvOS) is being used by a processor-based device to present the first narrative presentation to the first media content consumer via a presentation application.

11. The method of claim 10, further comprising:
determining how to provide the first media content consumer with access to the first instance of the first social media site based at least one part on the determination of the operating systems that is being used by the processor-based device to present the first narrative presentation to the first media content consumer via the presentation application.

12. The method of claim 11 wherein determining how to provide the first media content consumer with access to the first instance of the first social media site comprises determining whether to present the first instance of the first social media site to the first media content consumer via the presentation application or present within a selectable link within the presentation application, selection of which causes a switching between the presentation application and a second application, the second application different than the presentation application.

13. The method of claim 1 wherein providing the first content media consumer with access to a first instance of a first social media site includes providing access to the first set of social media content which comprises fictional content that represents content that would have been shared by at least the first character in the first narrative presentation.

14. The method of claim 1 wherein determining a current point of the first content media consumer in experiencing a presentation of the first narrative presentation comprises determining a timestamp associated with current point of the first content media consumer in experiencing the presentation of the first narrative presentation.

15. The method of claim 1 wherein the first narrative presentation is an interactive narrative presentation comprising a plurality of narrative segments selectable by the first content media consumer, and wherein determining a current point of the first content media consumer in experiencing a presentation of the first narrative presentation comprises determining a timestamp associated with current point of the first content media consumer in experiencing the presentation of a currently presented one of the narrative segments of the first narrative presentation.

16. The method of claim 1 wherein providing the first content media consumer with access to a first instance of a first social media site comprises providing the first content media consumer with access to a first instance of a first social media site that comprises at least one of social media text posts, social media photo sharing posts, social media video sharing posts, blogging posts or micro-blogging posts.

17. The method of claim 16, further comprising:
at the first time, providing the first content media consumer with access to a first instance of a second social media site, the first instance of the second social media site which includes a second set of social media content available to the first content media consumer during the first period of time, the second set of social media content comprising content that represents content that would have been shared by at least the first character in the first narrative presentation, a composition of the second set of social media content based on the determined current point of the first content media consumer in experiencing the presentation of the first narrative presentation, the composition of the second set of social media content different from the composition of the first set of social media content.

18. The method of claim 1, further comprising:
for a second content media consumer of the first narrative presentation,
at a second time, the second time different from the first time,
determining a current point of the second content media consumer in experiencing a presentation of the first narrative presentation; and
providing the second content media consumer with access to the first instance of a first social media site, the first instance of the first static social media site which includes the first set of social media content available to the second content media consumer during a second period of time, the first set of social media content comprising content that represents content that would have been shared by at least a first character in the first narrative presentation, a composition of the first set of social media content based at least in part on the determined current point of the second content media consumer in experiencing the presentation of the first narrative presentation, where the determined current point of the second content media consumer in experiencing the presentation of the first narrative presentation at the second time is the same as the determined current point of the first content media consumer in experiencing the presentation of the first narrative presentation at the first time.

19. The method of claim 1 wherein providing the first content media consumer with access to a first instance of a first social media site comprises providing the first content media consumer with access to a first faux static social media site, the content available via the first faux static social media site being identical for any content media consumer at a defined point in the presentation of the first narrative presentation independent of a real world time at which the respective content media consumer accesses the first faux static social media site.

20. The method of claim 1 wherein providing the first content media consumer with access to a first instance of a first social media site comprises providing the first content media consumer with access to a first faux static social media site which is populated entirely by content attributable to characters in the first narrative presentation.

21. A method of providing entertainment, the method comprising:
for a first content media consumer of a first narrative presentation,
at a first time,
determining a current point of the first content media consumer in experiencing a presentation of the first narrative presentation; and
providing the first content media consumer with access to a first instance of a first static social media site, the first instance of the first static social media site which includes a first set of social media content available to the first content media consumer during a first period of time, the first set of social media content comprising content that represents content that would have been shared by at least a first character in the first narrative presentation, a composition of the first set of social media content based at least in part on the determined current point of the first content media consumer in experiencing the presentation of the first narrative presentation, wherein providing the first content media consumer with access to a first instance of a first social media site comprises providing the first content media consumer with access to a first faux static social media site, the content available via the first faux static social media site being at least partially populated with content based on at least one characteristic or at least one attribute of the content consumer, the content of the first instance of the first social media site provided to the first media content consumer at a defined point in the presentation of the first narrative presentation, independent of a real world time at which the respective content media consumer accesses the first faux static social media site, being different from content of a first instance of a first social media site provided to a second media content consumer at the defined point in the presentation of the first narrative presentation.

* * * * *